United States Patent [19]
Yamada et al.

[11] Patent Number: 4,772,385
[45] Date of Patent: Sep. 20, 1988

[54] CONTROL FOR USE WITH REVERSE OSMOTIC TREATMENT SYSTEM

[75] Inventors: Koichi Yamada; Ichiro Hiraiwa; Shin Taniguchi; Toshinari Zengo, all of Tokyo, Japan

[73] Assignee: Ebara Corporation, Tokyo, Japan
[21] Appl. No.: 668,521
[22] PCT Filed: Apr. 10, 1984
[86] PCT No.: PCT/JP84/00180
   § 371 Date: Oct. 5, 1984
   § 102(e) Date: Oct. 5, 1984
[87] PCT Pub. No.: WO84/04049
   PCT Pub. Date: Oct. 25, 1984

[30] Foreign Application Priority Data

Apr. 11, 1983 [JP] Japan .................. 58-64385
Apr. 11, 1983 [JP] Japan .................. 58-64386
Apr. 27, 1983 [JP] Japan .................. 58-74673

[51] Int. Cl.[4] .......................................... B01D 13/00
[52] U.S. Cl. ........................... 210/87; 210/96.2; 210/103; 210/137; 210/149; 210/321.65
[58] Field of Search ............ 210/96.2, 103, 110, 210/111, 134, 137, 149, 321.1, 416.3, 433.2, 87

[56] References Cited

U.S. PATENT DOCUMENTS

| 3,405,058 | 10/1968 | Miller ......................... 210/137 X |
| 3,637,081 | 1/1972 | Bradley . | |
| 3,946,731 | 3/1976 | Lichtenstein .................. 210/87 |
| 4,113,614 | 9/1978 | Rollo et al. .................. 210/321.3 X |
| 4,169,789 | 10/1979 | Lerat ......................... 210/321.1 X |
| 4,176,057 | 11/1979 | Wheatley et al. . | |
| 4,267,040 | 5/1981 | Schal ......................... 210/149 X |
| 4,637,783 | 1/1987 | Andeen ....................... 417/318 |

FOREIGN PATENT DOCUMENTS

| 58-166904 | 10/1983 | Japan . |
| 2330445 | 1/1974 | Fed. Rep. of Germany . |
| 2627366 | 12/1977 | Fed. Rep. of Germany . |
| 2919315 | 11/1980 | Fed. Rep. of Germany . |
| 3141033 | 5/1982 | Fed. Rep. of Germany . |
| 2338091 | 8/1977 | France . |
| 2492470 | 4/1982 | France . |
| 57-4286 | 1/1982 | Japan . |
| 57-94306 | 6/1982 | Japan . |
| 58-166904 | 10/1983 | Japan . |

OTHER PUBLICATIONS

Peters, Max S., *Plant Design and Economics for Chemical Engineers*, 2nd Ed., McGraw-Hill Book Co., N.Y., 1968, pp. 457–461.
Kaup, Edgar, "Design Factors in Reverse Osmosis", Sep. Tech. 1, LIQ-LIQ SYS; L. Ricci Ed., Chem. Eng., McGraw-Hill, N.Y., 1980, Orig. Pub., 4/2/73, pp. 334–343.
Abcor Bulletin MS-72-7, Aug. 1972, Abcor Inc., Cambridge, Mass., "RO-940S Reverse Osmosis UNIT".
Chemical Engineering, vol. 91, No. 12, Jun. 1984, pp. 64–89, New York, U.S.; L. E. Applegate: "Membrane Separation Processes".
Ebara Engineering Review, Apr. 1980, No. 112, pp. 13–16, "High Pressure Pump and Power Recovery . . . " by J. Yoshioka.

*Primary Examiner*—Richard V. Fisher
*Assistant Examiner*—Richard D. Jordan
*Attorney, Agent, or Firm*—Wenderoth, Lind & Ponack

[57] ABSTRACT

A novel control for use with a reverse osmotic treatment system is disclosed. The unit (9) provides the desired flow of product solution from the system by controlling a "single" valve (3) disposed on a secondary line for conveying a concentrated solution coming out of a reverse osmotic apparatus (4). One application of this control unit is in desalination of salt water. Once the desired level of the flow of desalinated water ($Q_1$) is initially set, the control unit (9) determines automatically the necessary opening ($A_v$) of the valve in accordance with the performance characteristics (21 to 28) of the components of the desalination system [centrifugal pump (1), reverse osmotic apparatus (4) and the system line]. In response to this determination, the valve develops the desired pressure at the inlet of the reverse osmotic apparatus (4), which then produces desalinated water at a flow rate substantially equal to the initially set value ($Q_1$). In another aspect, the invention provides means (36, 38) for minimizing the power requirement of the centrifugal pump. In a further aspect, the invention provides monitors (FIGS. 8, 10, 12 and 13) for evaluating the performance of respective components of the treatment system. The monitors can be used for updating a set of information about the performance of the system with which the control unit is used.

23 Claims, 16 Drawing Sheets

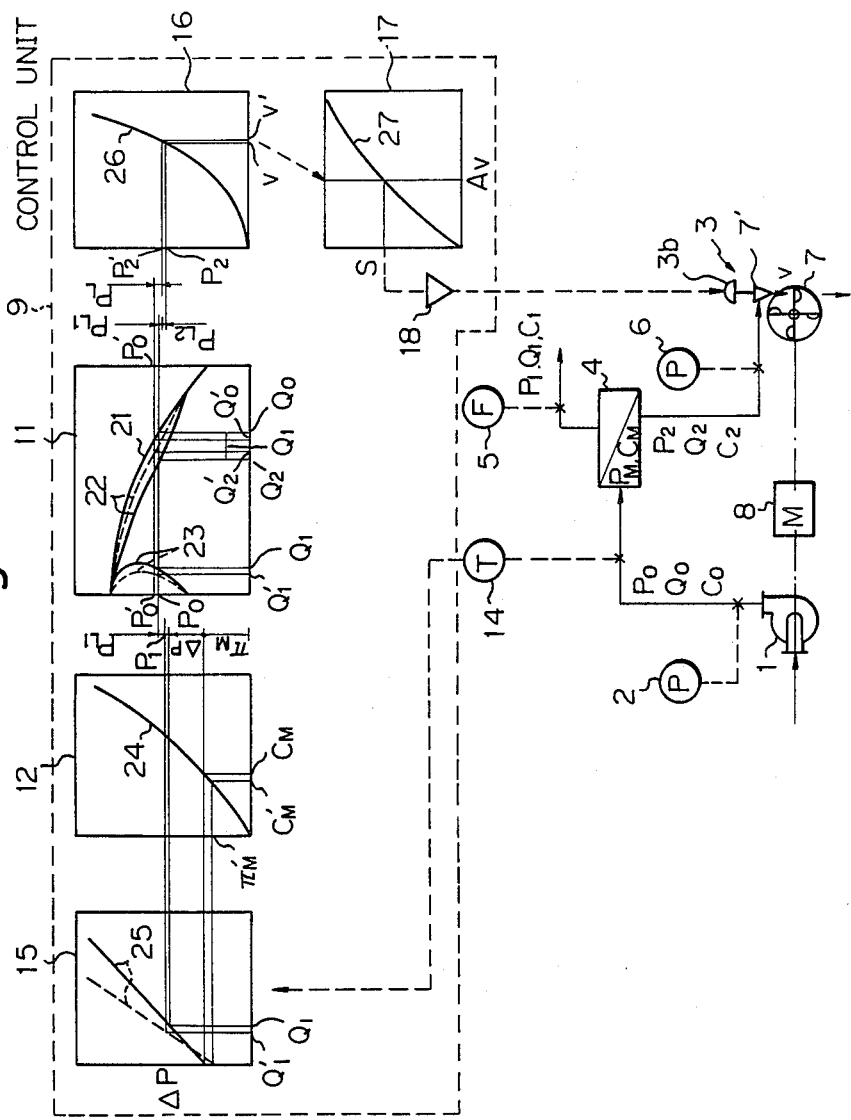

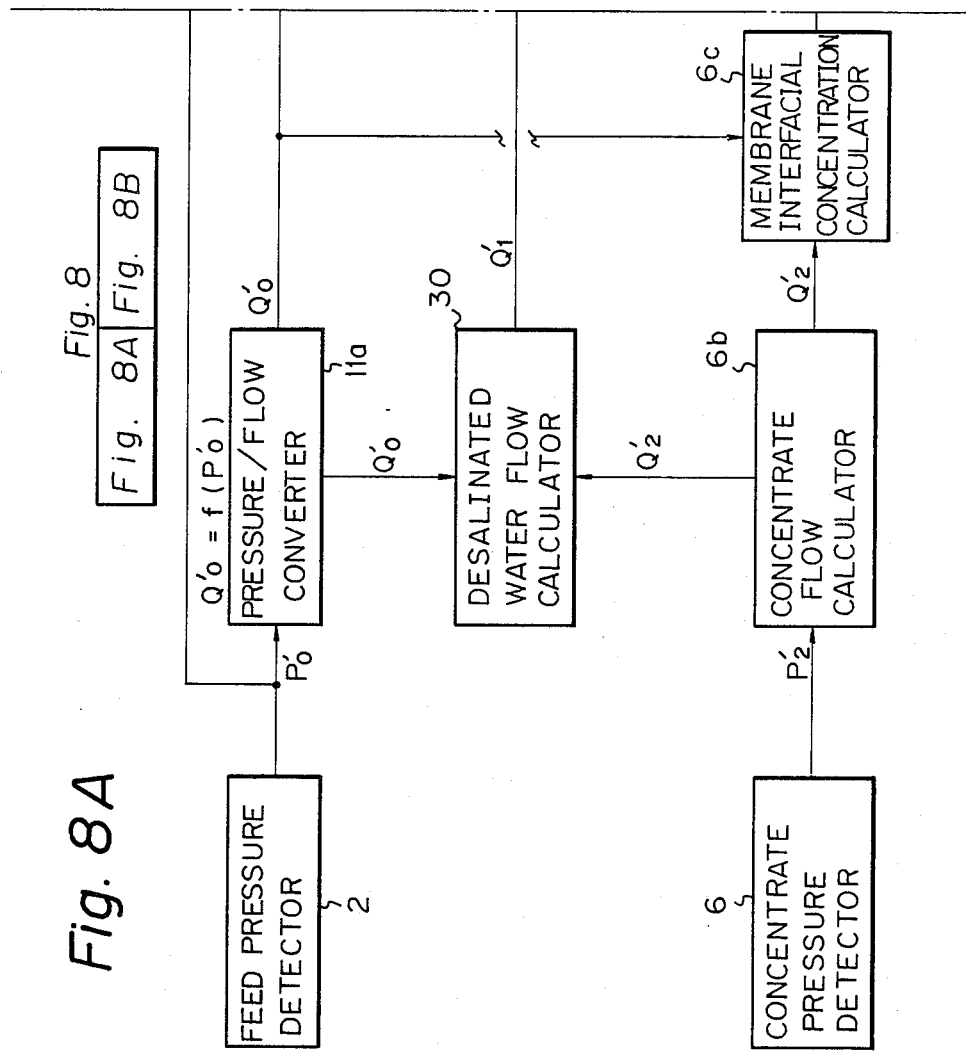

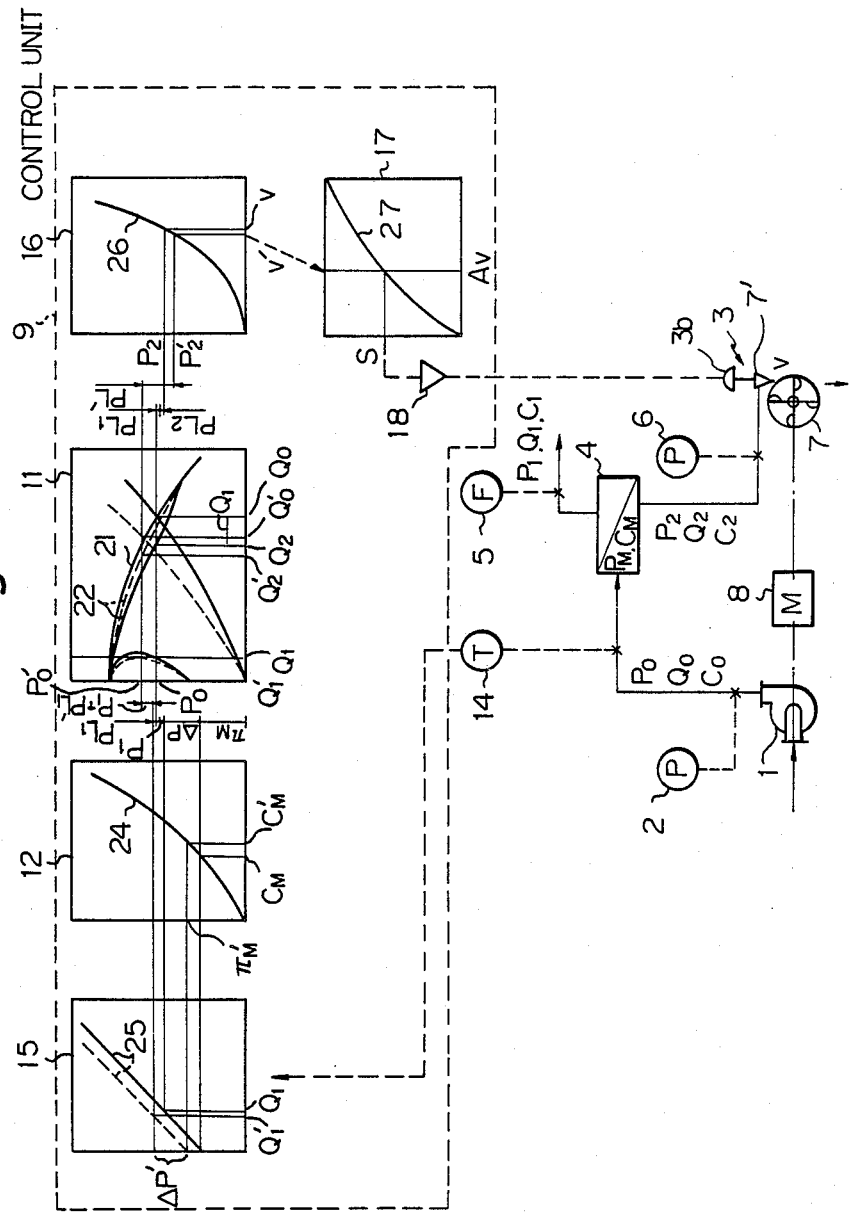

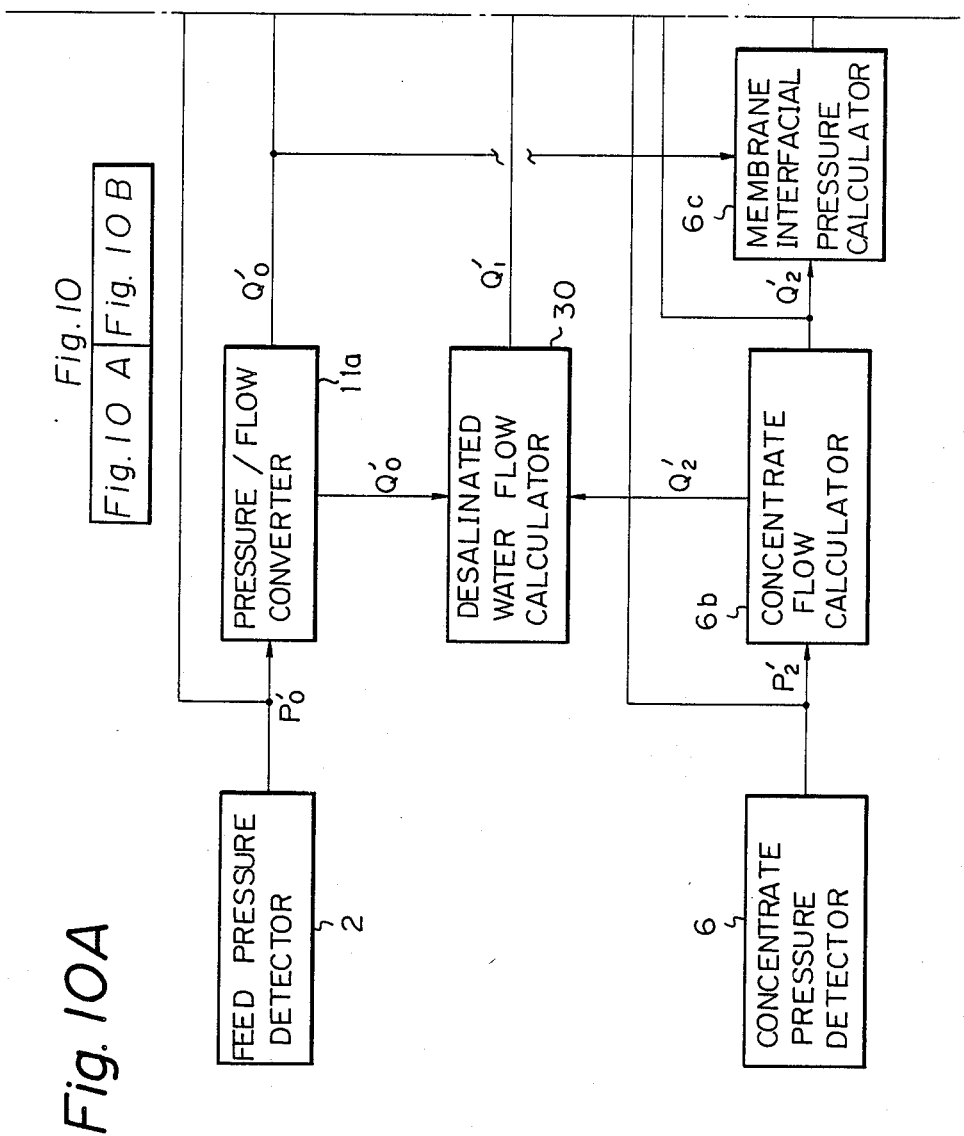

CONTROL FOR USE WITH REVERSE OSMOTIC TREATMENT SYSTEM34

BACKGROUND OF THE INVENTION

1. Technical Field:

The present invention relates to a control for use with a reverse osmotic. treatment system. More particularly, the invention relates to an apparatus for controlling the flow of a product fluid from a reverse osmotic treatment system using a fluid pressurizing means such as a centrifugal pump.

2. Prior Art:

A reverse osmotic treatment system is equipped with a reverse osmotic apparatus using semipermeable membranes. An impure fluid boosted by a pressurizing means of pump type is fed to the reverse osmotic apparatus, which separates the feed fluid into a relatively pure portion which has passed through the semipermeable membrane and is substantially made of the solvent, and a portion with a higher concentration of the solute.

The reverse osmotic treatment system is typically used in plants for desalinating salt waters such as brine, brackish and seawater. In order to produce desalinated water, the feed fluid must be pressurized to a value exceeding its osmotic pressure.

A system has recently been developed for desalinating a large volume of seawater with the reverse osmotic apparatus. In this system, the feed fluid is pressurized by a centrifugal pump in place of a reciprocating pump which is commonly employed in the small-scale system. This new type of reverse osmotic treatment system has a problem in connection with adjustment of the frow of the product solution (desalinated water when the feed solution is seawater, and a concentrated solution if the feed contains a chemical).

A typical configuration of the prior art technique for controlling the flow of product fluid from the reverse osmotic treatment using a centrifugal pump as a pressurizing means is shown in FIG. 1. The reverse osmotic treatment system shown is used to desalinate seawater. A centrifugal pump 1 driven by a motor 8 pressurizes the seawater and sends it to a reverse osmotic apparatus 4 composed of a plurality of reverse osmotic modules. Deslinated water coming out of the semipermeable membrane in each module is stored in a tank 6. A concentrated solution also comes out of the reverse osmotic apparatus but by a different channel and is squirted against a hydraulic turbine 7 of Pelton wheel type through a nozzle 7'. The power shaft of the turbine 7 is directly coupled to the rotor of the motor 8 and feeds back the rotary energy to the pump 1.

The control system shown in FIG. 1 includes an indicator 2a which indicates the pressure detected by a pressure sensor at the inlet 2' of the reverse osmotic apparatus (the indicator may be replaced by a pressure indication control which indicates a set value of pressure as well as the detected pressure), and a pressure regulating valve 2 provided on the primary or feed line between the pump 1 and the reverse osmotic apparatus which is controlled either manually or automatically by the control 2a to provide a feed pressure which is equal to the set value. The control system further includes a flow indicator 3a which indicates the flow detected by a flow sensor at point 3' on the feed line (this indicator may be replaced by a flow indication control with indicates a set value of flow as well as the detected flow), and a flow regulating valve 3 with a integral nozzle 7' which is disposed at the terminal end of the concentration or secondary line and which is controlled either manually or automatically by the control 3a to provide a flow of the concentrated solution that is equal to the set value, The line on which the desalinated water flows is provided with a flowmeter 5 for measuring the flow of the desalinated water.

In the prior art control, the reverse osmotic treatment system is operated in such a manner that the recovery percentage or the ratio of the flow of desalinated water to that of the feed solution is held constant, In some cases, it is desired to switch the system operation to such a mode that the desired flow of desalinated water is increased (or descreased) by a significant amount (e.g. tens of percent). However, with the prior art system, complicated valve operations are necessary to achieve the newly set value of the desired flow of desalinated water. For one thing, each of the valves 2 and 3 must be shifted bit by bit to avoid the hydraulic interference therebetween. For another, the final stage of valve adjustment is solely the responsibility of a skilled operator who makes the fine tuning by referring to the reading on the flowmeter 5. This is partly because it has been impossible to predict accurately the value of the feed pressure necessary to accomplish the desired flow of desalinated water although the flow of the feed solution can be determined by dividing the flow of desalinated water by a fixed recovery percentage. The time required to make full adjustment to a new operating mode is of the order of hours (typically 2 hours).

The pressure regulating valve 2 disposed on the feed line causes a pressure drop in the fluid, and this results in a corresponding decrease in the pressure of the fluid to be supplied to the reverse osmotic apparatus. As a result, a centrifugal pump having a relatively large capacity to compensate for the pressure drop caused by the valve becomes necessary, thus being accompanied by two disadvantages: lower efficiency of the production of desalinated water, and a relatively large power requirement.

A further disadvantage of the prior art control system is its high cost due to the use of a relatively large number of components (i.e. two valves, a pressure sensor, a pressure indication control, a flow sensor) and a flow indication control). Also, it is desired to make automatic checking of the individual components of the reverse osmotic treatment system for a decrease in their performance. More desirably, such a decrease should be evaluated quantitatively.

SUMMARY OF THE INVENTION

Therefore, one object of the present invention is to provide a control of a relatively low cost which may be used with a reverse osmotic treatment system.

Another object of the present invention is to provide a control apparatus capable of efficient and automatic control over the flow of product solution coming out of the reverse osmotic treatment system. With tne control of the present invention, the previously required complicated valve operations are not necessary.

In one aspect of the present inventon, there is provided a control apparatus comprising tne following elements: (1) a single means provided in the concentration line for establishing the pressure of the fluid in the system, (2) a means for setting the desired flow of the product fluid (purified or concentrated fluid, depending on the applications), (3) a means which, responsive to the desired value of product fluid flow sent from the setting means, determines the associated system pressure in accordance with the performance characteristics of the centrifugal pump used in the system and the performance characteristics of the reverse osmotic apparatus which is also in the system, and 4) a means for providing a control signal to the pressure establishing means in response to the pressure signal sent from the pressure determining means. The system is so designed that the pressure establishing means provides a pressure substantially equal to the determined system pressure, thereby achieving a flow of the product fluid which is substantially equal to the value desired by the system. Preferably, the pressure establishing means consists of a single controllable valve and a valve actuator therefor. In this case, the pressure control means provides the actuator with a control signal which shifts the valve by a stroke sufficient to establish the determined system pressure.

Still another object of the present invention is to minimize the power requirement for the pump necessary for attaining the desired flow of the product fluid.

In order to achieve this object, the control apparatus of the present invention further inclues an optimizing means responsive to the desired value of the flow of purifiled fluid sent from the setting means for determining the optimum rotational speed of the centrifugal pump, at which speed the maximum flow of the purified fluid attained by the system is substantially equal to the initially set value, and a means which, responsive to said optimizing means, controls the speed of the pump-driving means such as electric motor, engine, gas turbine, etc. so that the driving means as well as the pump is rotating at an optimum speed.

A further object of the present invention is to provide a device capable of checking individually the components of the reverse osmotic treatment system for a drop in the performance of a specific component.

In order to achieve this object, the device provided by the present invention comprises a first means for detecting a state level of the fluid being fed to the reverse osmotic apparatus, a second means for detecting a state level of the concentrated fluid being discharged from the reverse osmotic apparatus, a reference means which provides the normal values of the state levels of the feed and concentrated fluids which obtained if the system operating under normal conditions, and a comparator means which provides a signal indicative of a drop in the performance of a certain component by comparing the normal state levels from the reference means with the detected state levels from the first and second detecting means.

This device will automatically inform the operator of the need for inspection, repair or replacement of a certain defective component. Preferably, the first detecting means is a pressure sensor for detecting the pressure of the feed fluid, and the second detecting means is a pressure sensor for detecting the pressure of the concentrated solution. If the detected pressures of the feed fluid $P_0'$ and concentrated fluid $P_2'$ are higher than their respective normal values $P_0$ and $P_2$ sent from the reference means, the comparator means delivers an output signal that indicates a drop in the performance of the reverse osmotic apparatus. If $P_0 < P_0'$ $P_2 < P_2'$, the comparator means generates a signal indicating the occurrence of fluid clogging in the system line. If $P_0 > P_0'$ and $P_2 > P_2'$, the comparator means issues an output signal indicative of a drop in the performance of the centrifugal pump.

A still further object of the present invention is to provide devices for monitoring the performance of the reverse osmotic treatment system.

In order to achieve this object, the present invention provides three devices, one for monitoring the performance of the centrifugal pump, another for monitoring the performance of the reverse osmotic apparatus, and the third for monitoring the performance of the fluid channels or lines.

The device for monitoring the performance of the centrifugal pump comprises a first pressure sensor for detecting the pressure of the solution being fed into the reverse osmotic apparatus, a second pressure sensor for detecting the pressure of the concentrated solution that has been separated from the feed solution by the reverse osmotic apparatus, a means for determining the operating position of a pressure establishing means (e.g. valve) disposed on the concentration line, a means which, responsive to signals from the first and second pressure sensors, as well as from the valve positioning means, determines the flow of the feed solution being discharged from the centrifugal pump in accordance with the performance characteristics of the reverse osmotic apparatus and fluid channels, and a means which, in responseto said flow determining means, evaluates a parameter associated with the degree by which the present operating point of the pump deviates from the normal operating point.

In one embodiment, this parameter evaluating means includes a means for determining the ratio of the present value of the pump discharge pressure to the normal value.

The device for monitoring the performance of the reverse osmotic apparatus comprises a first pressure sensor for detecting the pressure of the solution being fed into the reverse osmotic apparatus, a second pressure sensor for detecting the pressure of the concentrated solution that has been separated from the feed solution by the reverse osmotic apparatus, a means for determining the operating position of a pressure establishing means (e.g. valve) disposed on the concentration line, and a means which, responsive to signals from the first and second pressure sensors, as well as from the valve positioning means, determines the performance index $K_0'$ of the reverse osmotic apparatus in accordance with the performance characteristics of the centrifugal pump and fluid channels.

The device for monitoring the performance of fluid channels comprises a first pressure sensor for detecting the pressure of the solution being fed into the reverse osmotic apparatus, a second pressure sensor for detecting the pressure of the concentrated solution that has been separated from the feed solution by the reverse osmotic apparatus, a means for determining the operating position of a pressure establishing means disposed on the concentration line, and a means which, responsive to signals from the first and second pressure sensors, as well as from the positioning means, evaluates the pressure loss of the fluid in both feed and concentration lines in accordance with the performance characteristics of the centrifugal pump and reverse osmotic apparatus.

These monitoring devices will tell the operator the degree by which the performance of the respective system components has deteriorated. Preferably, each monitor further includes a memory which stores periodically the value of the performance of the specific component (as provided from the corresponding evaluation means) and a means for retrieving the stored data and indicating the history of the performance of the particular component.

Yet another object of the present invention is to provide a control apparatus for use with the reverse osmotic treatment system which ensures providing the desired flow of product fluid by modifying the control signal being applied to the pressure establishing means from the positioning means in accordance with the present state of the system performance that is subject to changes with time.

In order to achieve this object, the first mentioned control apparatus further includes a means for modifying the control signal from the positioning means by using the value that evaluates the present performance of a certain system component and which is supplied from the corresponding monitoring device shown above.

When there is a change in the temperature of the feed solution, the flow of the product solution coming out of the reverse osmotic treatment system also changes. Therefore, a further object of the present invention is to provide a control apparatus capable of compensating for the change in the temperature of the feed solution.

In order to achieve this object, the control apparatus of the present invention further includes a temperature sensor for detecting the temperature of the feed solution being fed into the reverse osmotic apparatus and a means which calibrates the performance characteristics of the reverse osmotic apparatus in response to a temperature signal from said temperature sensor.

In the prior art control system, the desired flow of desalinated water $Q_1$ is achieved while the recovery percentage $Q_1/Q_0$ is held constant. However, the present invention uses a new approach in control, according to which variations in the recovery percentage are permitted to the extent that they do not exceed the critical level tolerated by the reverse osmotic apparatus.

These and other objects of the present invention, as well as its features and advantages will become apparent by reading the following description taken in conjunction with the accompanying drawings.

BRIEF DESCRIPTION OF THE DRAWINGS

FIG. 7 is generally the same as FIG. 2 and illustrates the characteristics for the case of a deteriorated reverse osmotic apparatus, in comparison with those for the normally operating apparatus.

FIG. 9 is generally the same as FIG. 2 and illustrates the characteristics for the case of a line clogging, as compared with those for the normal conditions.

DETAILED DESCRIPTION OF THE PREFERRED EMBODIMENTS

Figure 1:
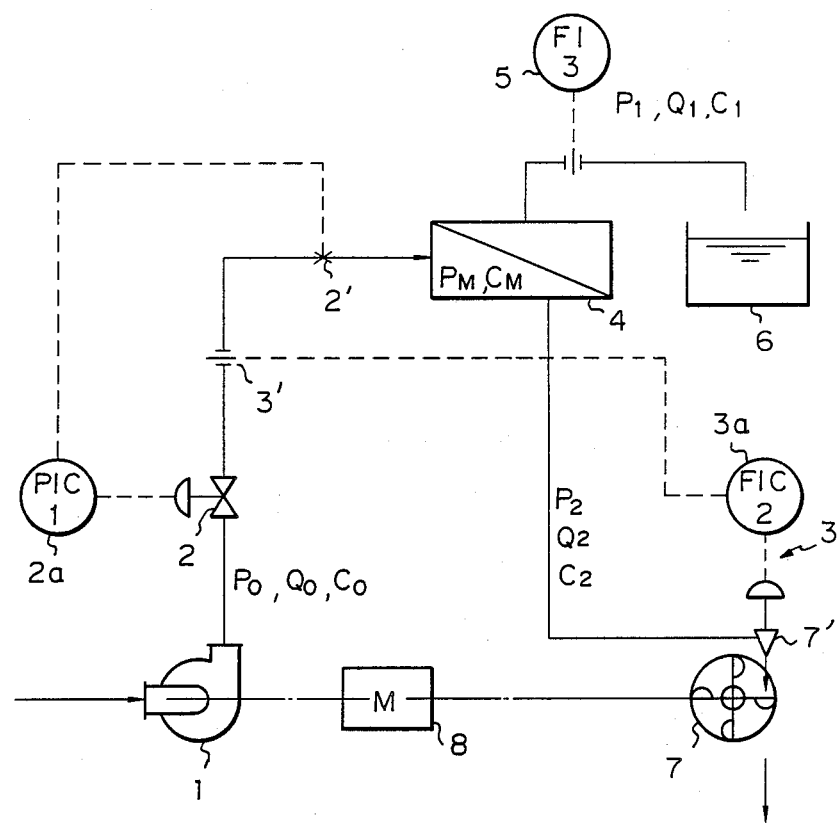
FIG. 1 is a schematic diagram of the prior art control for use with a reverse osmotic treatment system.

The preferred embodiments of the present invention are hereunder described in the following order.
I. Control for Reverse Osmotic Treatment System by Use of Single Valve
  (i) Overview
  (ii) Reverse osmotic treatment system
  (iii) Control unit (FIG. 2)
    (A) Procedure for determining pump discharge pressure from the desired level of the flow setting of desalinated water
    (B) Procedure for determining the valve opening from pump discharge pressure $P_0$ and other parameters
    (C) Implementation of control unit 9
  (iv) Modifications
II. Minimizing Power Requirement for Pump by Using Optimum Rotational Speed
  (i) Overview
  (ii) Optimum speed of pump (FIG. 4)
  (iii) Control at optimum pump speed (FIGS. 5 and 6)
III. Monitoring the Performance of Each of the Components of the Reverse Osmotic Treatment System, Evaluating the Degree of Deterioration of Its Performance, and Identifying the Type of Specific Trouble
  (i) Overview
  (ii) Devices for detecting the deterioration of the membrane performance, determining the deteriorated membrane performance index, and monitoring the membrane performance
    (A) Detecting a drop in the membrane performance
    (B) Procedure for determining the membrane perfomance index $K_0'$
    (C) Membrane performance monitor (FIG. 8)
  (iii) Detecting a drop in the system performance due to scale deposit in the fluid channel, and device for monitoring the pressure loss in the channel
    (A) Detecting a drop in system performance due to clogged channel
    (B) Procedure for determining the pressure loss of fluid in a channel
    (C) Device for tracking or monitoring pressure loss (FIG. 10)
  (iv) Detecting a drop in the performance of the pulp, and device for determining the degree of deterioration and monitoring the pump performance (A) Detecting a drop in the pump performance
(B) Procedure for evaluating the degree of deterioration of pump performance
(C) Device for monitoring pump performance (FIG. 12)
(v) Modifying the valve opening by the monitors
(vi) Trouble detecting device for the three system components (FIG. 13)

I. Control for Reverse Osmotic Treatment System by Use of Single Valve (i) Overview According to the control system of the present invention, only a single operating means (such as of valve type) provided on a channel for concentrated fluid at a point downstream of a reverse osmotic apparatus is used to establish a system pressure. The control system according to the present invention obviates a prior art pressure adjusting means of valve type positioned between a centrifugal pump and the reverse osmotic apparatus. In the control system of the present invention, the single pressure establishing means is provided with a suitable control signal that adjusts the pressure on the semipermeable membrane in the reverse osmotic apparatus to achieve the desired flow of product fluid or desalinated water. The present inventors have found that once the flow of desalinated water is set at a desired level, the pressure on the semipermeable membrane that achieves that flow setting can be determined. This pressure can be established by providing a corresponding operating input into the single pressure establishing means or valve disposed on the channel for concentrated fluid at a point downstream of the reverse osmotic apparatus.

(ii) Reverse Osmotic Treatment System

Figure 2:
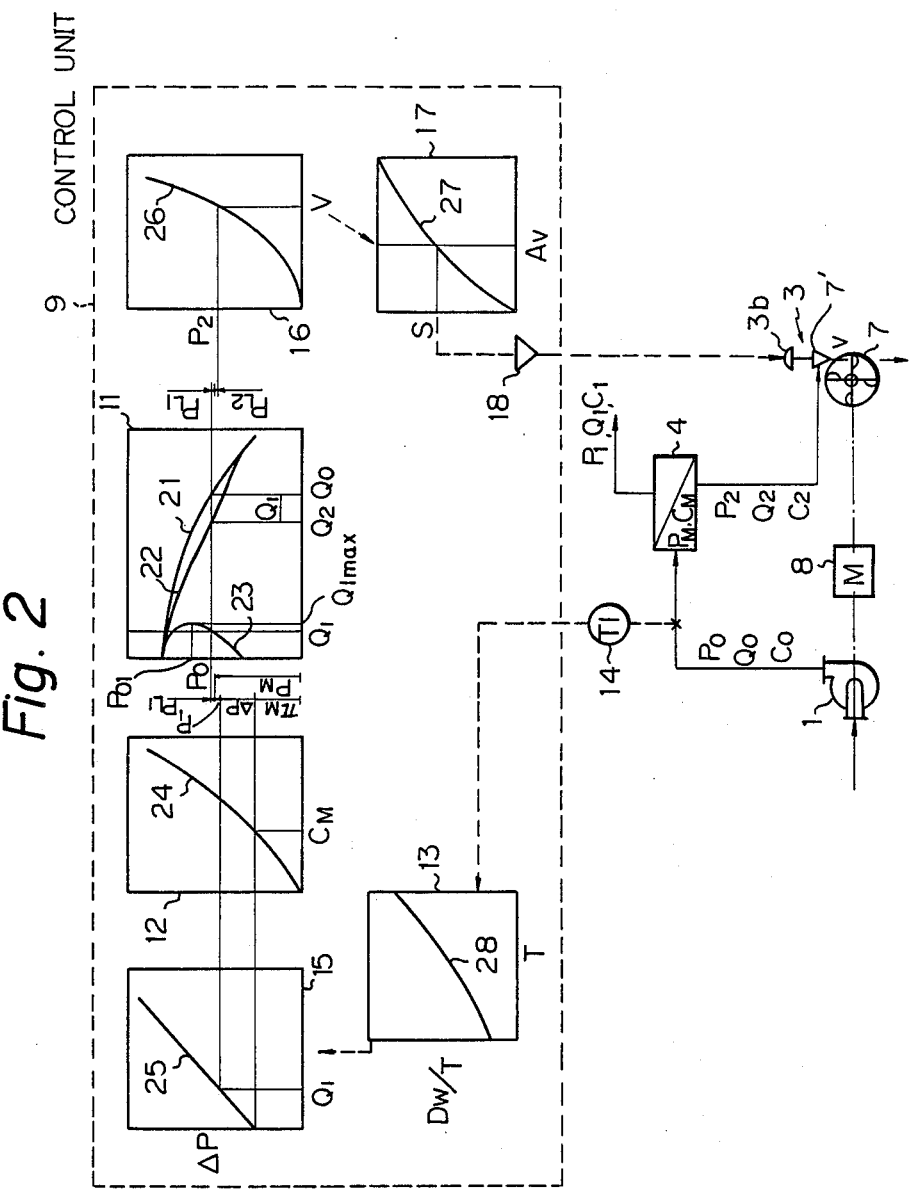
FIG. 2 is a block diagram of the control for use with a reverse osmotic treatment system according to the operating principle of the present invention.

An embodiment of the reverse osmotic treatment system to which the present invention is applied is described hereunder. Referring to FIG. 2, the reverse osmotic treatment system shown is used to desalinate seawater. A centrifugal pump 1 receives pretreated seawater from an intake pump, pressurizes it and sends the pressurized seawater to a reverse osmotic apparatus 4 comprised of a plurality of reverse osmotic modules or units of semipermeable membrane type. The symbols Po, Qo and Co represent the pressure, flow and concentration of the discharged seawater, respectively. In order to produce desalinated water from the reverse osmotic apparatus 4, the hydraulic pressure $P_M$ of feed seawater or primary fluid at the interface with the semipermeable membrane in each module must be higher than the reverse osmotic pressure $\pi_M$ of the primary fluid near the interface. The difference between $P_M$ and $\pi_M$ is generally referred to as the reverse osmotic pressure. Stated more correctly, the reverse osmotic pressure is also dependent on the hydraulic pressure and osmotic pressure of the product fluid or desalinated water coming out of the reverse osmotic apparatus 4. The pressure, flow and concentration of desalinated water are respectively shown by $P_1$, $Q_1$ and $C_1$ in FIG. 2. The fluid of high concentration coming out of the reverse osmotic apparatus passes through a concentration or secondary line to be discharged from the system. The symbols $P_2$, $Q_2$ and $C_2$ shown adjacent the secondary line represent the pressure, flow and concentration of the secondary fluid of high concentration, respectively.

According to the system of the present invention, the secondary line is provided with a single system pressure establishing means or valve 3. The valve 3 includes a valve actuator 3b that operates in response to a signal supplied from a control unit 9 to be described later in this specification. The valve actuator 3b shown adjusts the valve stroke to define the opening or aperture area of a nozzle 7'. The system shown in FIG. 2 includes an energy recovery means. The nozzle 7' supplies a water jet to a hydraulic turbine 7 of Pelton wheel type for its rotation. The turbine 7 is mechanically coupled to a pump driving motor 8 and supplies part of the energy necessary for driving the pump 1. This energy recovery means has energy saving as its sole object and hence is not essential for achievement of the primary objective of the control system of the present invention. A temperature sensor 14 is provided on the primary fluid channel connecting the centrifugal pump 1 to the reverse osmotic apparatus 4. The output from the temperature sensor 14 is used for temperature calibration in the control unit to be described hereunder.

It has heretofore been generally understood that the valve 3 positioned alone downstream of the reverse osmotic apparatus is unable to establish the desired level of the desalinated water flow $Q_1$. This is partly due to the replacement of a reciprocating pump with a centrifugal pump in recent times as a means for pressurizing fluids. With the centrifugal pump, a change in the opening of the valve 3 will cause a change in both the flow and pressure of the primary fluid (seawater) being discharged from the pump.

According to the present invention, a selected opening for the single valve is capable of providing the desired level of the flow of product fluid or desalinated water.

(iii) Control Unit (FIG. 2)

The control unit according to the present invention is provided with two capabilities: one is to determine a pressure for establishing a desired preselected level of the flow of product fluid or desalinated water, and the other is to determine and provide a corresponding operating amount (stroke) for the valve so as to enable the establishment of that pressure.

Figure 3:
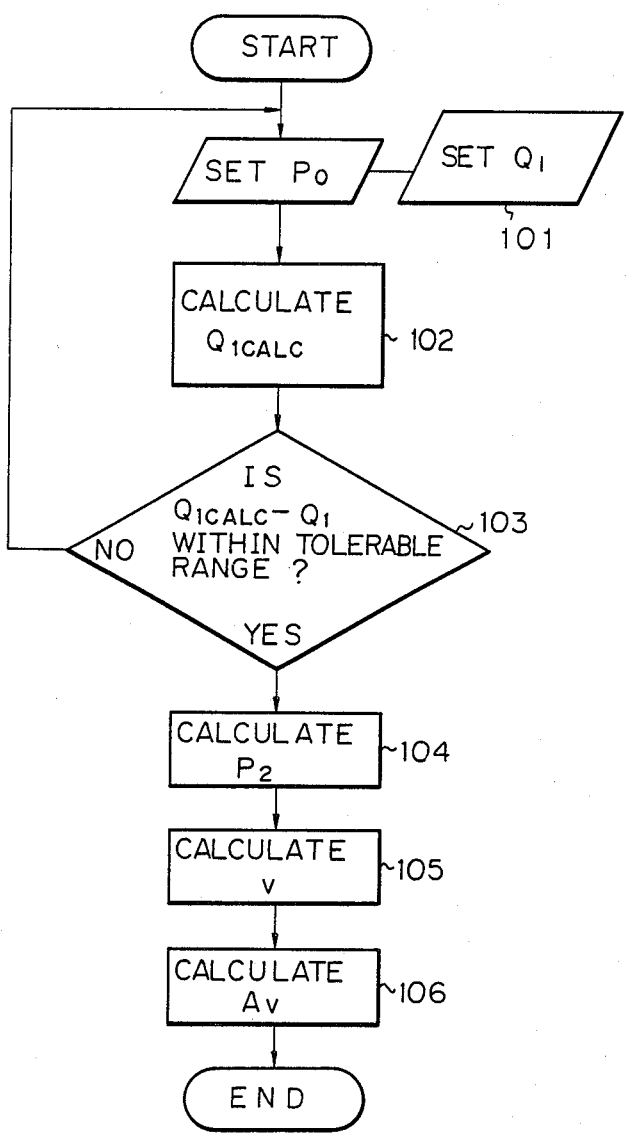
FIG. 3 is a flowchart showing the operations for determining the valve opening (or aperture area) from the preset desired value of the flow of desalinated water.

(A) Procedure for determining pump discharge pressrure from the desired level of the flow setting of desalinated water (FIGS. 3 and 2)

The flow $Q_1$ of a solution or fluid of low concentration that is produced from a reverse osmotic apparatus is given by the following correlation:

$$Q_1 = A_M K \Delta P \quad (1)$$

wherein
$A_M$: effective area of the semipermeable membranes in the reverse osmotic apparatus
K: performance index as determined by the physical properties, structure and temperature of the semipermeable membrane
$\Delta P$: reverse osmotic pressure.

The reverse osmotic pressure is given by the correlation:

$$P = (P_M - P_1) - (\pi_M - \pi_1) \quad (2)$$

wherein $P_M$: average pressure applied on the surface of the membrane in contact with the feed or primary fluid $P_1$ pressure of product fluid (desalinated water) on the secondary side of the membrane $\pi_M$ osmotic pressure of feed fluid near its interface with the membrane $\pi_1$: osmotic pressure of product fluid (desalinated water) on the secondary side of the membrane For better understanding of the present invention, the procedure of determining the system pressure from a preset level of the flow of desalinated water is described hereunder. The procedure shown below relies on a particular algorithm for converging the discharge pressure $P_0$ of centrifugal pump 1, but it may be readily understood by those skilled in the art that they can use any other algorithm that fits their specific need in view of the description in this specification.

(1) Set the flow of desalinated water $Q_1$ (routine 101 in FIG. 3).

(2) Suppose or initialize the value of the discharge pressure $P_0$ of pump 1 (routine 101 in FIG. 3).

(3) Use the performance characteristic (Head-Discharge or Q-H curve) of a centrifugal pump to determine $Q_0$, the discharge from the pump or flow of feed seawater, that corresponds to the initial value of pressure $P_0$. The pump performance curve is shown by reference numeral 21 in graph 11 in FIG. 2. The horizontal and vertical axes of graph 11 indicate the flow and pressure, respectively, of the feed seawater.

(4) According to continuity principles, $Q_2$ or the flow of the secondary fluid or solution of high concentration is given by:

$$Q_2 = Q_0 - Q_1$$

wherein $Q_1$ is the initially set value of the flow of desalinated water, and $Q_0$ is the value determined in step (3).

(5) The concentration $C_M$ of feed solution near the surface of a semipermeable membrane is given by the following approximation:

$$C_M \approx (C_0 + C_2)/2.$$

If the concentration of desalinated water $C_1$ can be disregarded, the following equation is derived:

$$C_M = C_0(1 + Q_0/Q_2)/2.$$

Therefore, $C_M$ can be determined from $C_0$, constant for the concentration of seawater, and $Q_0$ and $Q_2$ calculated in steps (3) and (4), respectively.

The above will be a good approximation for the system for desalinating seawater, but if a more accurate value is desired, a better correlation that will be apparent to those skilled in the art may be used.

(6) Since the osmotic pressure is a function of concentration, the concentration of feed solution $C_M$ can be used to determine the corresponding osmotic pressure $\pi_M$. Graph 12 in FIG. 2 illustrates the concentration vs. osmotic pressure profile by curve 24.

(7) Temperature calibration:

If the feed seawater is subject to a significant change in temperature, a temperature sensor 14 is used to detect the temperature of the solution flowing through the feed line. If the temperature detected is T, the value of membrane performance index K, can be calibrated by the following formula:

$$K = K_0(D_w/T)$$

wherein $K_0$: constant as determined by the physical properties and structure of the semipermeable membrane $D_w$: diffusion coefficient of water in the membrane T: temperature of the feed solution Graph 13 in FIG. 2 illustrates the T vs. $D_w/K$ profile by curve 28.

In the absence of a change in the temperature of the feed solution, a constant can be used as membrane performance index K.

(8) By subtracting $P_{L1}$, the pressure loss of fluid from the pump to the semipermeable membranes in the reverse osmotic apparatus 4 from $P_0$, the initial setting of pump discharge pressure obtained in step (2), $P_M$ or the pressure on the feed side of the membrane can be determined. The line pressure loss $P_{L1}$ is dependent on the flow of feed fluid, as it can be determined from $Q_0$ (as obtained in step (3)) either empirically or by a suitable correlation (e.g. $P_{L1} = a_1 Q_0^2$).

(9) The reverse osmotic pressure $\Delta P$ is given by:

$$\Delta P = (P_M - P_1) - (\pi_M - \pi_1).$$

In normal operation of the system, the pressure of desalinated water $P_1$ and its osmotic pressure $\pi_1$ maintain substantially fixed levels and hence can be regarded as two constants. Using these constants, as well as $\pi_M$ and $P_M$ determined in steps (6) and (8), the reverse osmotic pressure $\Delta P$ can be obtained.

(10) As already mentioned, the flow of desalinated water $Q_1$ is given by the equation: $Q_1 = A_M K \Delta P$. In this formula, $A_M$ is a known constant (the effective area of the semipermeable membrane), so the flow of desalinated water can be calculated by using this constant, as well as the membrane performance index K determined in step (7) ad the reverse osmotic pressure $\Delta P$ determined in step (9). This calculation step is shown by routine 102 in FIG. 3. In the pages that follow, the calculated value of the flow of desalinated water will be represented by $Q_{1CALC}$. The correlation between the flow of desalinated water and the reverse osmotic pressure $\Delta P$ is illustrated in graph 15 in FIG. 2 by a straight line 25.

(11) In this step, $Q_1$, which has been set in step (1), is compared with $Q_{1CALC}$ (routine 103 in FIG. 3). If the difference between the two values is greater than a tolerable limit, update the pump discharge pressure $P_0$, and repeat the sequence of steps (2) thru (10), or $Q_{1CALC}$ obtaining routines 101 and 102, until the difference between the initially set $Q_1$ and the determined $Q_{1CALC}$ becomes smaller than the tolerable limit. In other words, this updating oeration is performed in such a manner that the value of $Q_{1CALC}$ obtained by calculation with the updated $P_0$ converges to the set value of $Q_1$. It will be understood by those skilled in the art that various algorithms can be used for achieving this convergence.

A preset value $Q_1$ of the flow of desalinated water generally has two corresponding values as $P_0$ or the discharge pressure of a pump. This is owing to the characteristic relation of the flow of desalinated water as against the pump discharge pressure or the pressure on the reverse osmotic apparatus. Graph 11 in FIG. 2 illustrates with curve 23 the pump discharge pressure vs. desalinated water flow. If the pump discharge pressure $P_0$, hence the water pressure $P_M$ on the reverse osmotic apparatus, has a small value that is unable to overcome the osmotic pressure $\pi_M$ of feed solution in the reverse osmotic apparatus (i.e. $\Delta P<0$), desalinated water will not be produced. As the discharge pressure of the pump increases, the osmotic pressure $\pi_M$ of the feed solution at the semipermeable membrane will also increase. However, in the early stage, the rate of increase in the pump discharge pressure is greater than that of increase in the osmotic pressure $\pi_M$, and therefore, the reverse osmotic pressure $\Delta P$ continues to increase, causing a proportional increase in the flow of desalinated water. When the rate of increase in the reverse osmotic pressure $\Delta P$ becomes zero, a maximum flow of desalinated water $Q_{1max}$ is attained (see curve 23 in FIG. 2). A further increase in the pump discharge pressure will result in the decrease of the reverse osmotic pressure $\Delta P$. This leads to a decreased flow of desalinated water. Finally, the flow of desalinated water becomes zero at a pressure corresponding to a point on the Q-H characteristic curve of the pump where the flow of primary fluid is zero.

To summarize, the characteristic curve for the flow of desalinated water vs. pump discharge pressure or water pressure on a semipermeable membrane in the reverse osmotic apparatus consists of two regions: one is the area where the flow of desalinated water increases with increasing pressure, and the other is the area where the flow of desalinated water is decreased by a further increase in pressure. Characteristic curve 23 is obtained by plotting, according to the above procedure, values of pump discharge pressure $P_0$ corresponding to various settings of the flow of desalinated water $Q_1$.

Curve 22 in graph 11 (FIG. 2) illustrates the relation of $Q_2$, the flow of the secondary fluid or solution of high concentration, as against the pump discharge pressure $P_0$. This curve can be obtained by subtracting the $P_0$-$Q_1$ characteristic curve 23 from the Q-H characteristic curve 21 of pump 1.

As already mentioned, there are two calculated values of the pump discharge pressure that satisfy a specific set value of the flow of desalinated water $Q_1$. In order to use only one value as a discharge pressure setting, the following two requirements for system operation are used as selection criteria. The first and principal requirement is that the recovery percentage, or the ratio of the flow of desalinated water to the flow of the primary fluid ($Q_1/Q_0$), be within a tolerable range that guarantees normal operation of the reverse osmotic apparatus. The second requirement for selection is that the pump be drivable by less energy.

In this manner, $P_0$ the pressure of the primary fluid or the discharge pressure of pump 1 that provides the desired level of the flow of desalinated water $Q_1$ and satisfies the two requirements for system operation has now been determined. Also, other system state variables including the corresponding flow of the primary fluid $Q_0$ and that of the secondary fluid (concentrated solution) have been determined.

(B) Procedure for determining the valve opening from pump discharge pressure $P_0$ and other parameters

(12) The pressure of concentrated solution $P_2$ at nozzle 7' can be empirically determined from the three values determined in step (11), i.e. the discharge pressure $P_0$ of pump 1, the flow of primary fluid $Q_0$ and the flow of concentrated solution $Q_2$. Alternatively, the following correlation can be used for calculation of $P_2$:

$$P_2 = P_0 - P_{L1} - P_{L2}$$

wherein $P_{L1}$: fluid pressure loss in line from pump 1 to reverse osmotic apparatus 4

$P_{L2}$: fluid pressure loss in line from reverse osmotic apparatus to nozzle 7'.

In the right side of the correlation, $P_{L1}$ is given by $a_1 Q_0^2$ and $P_{L2}$ by $a_2 Q_2^2$, wherein $a_1$ and $a_2$ are each a loss constant.

If the line pressure loss of fluid is much smaller than the pump discharge pressure and there will not great functuation in the flow of primary fluid and concentrated solution, a constant may be used for both $P_{L1}$ and $P_{L2}$.

(13) Nozzle 7' is a device for converting a hydraulic pressure to the kinetic energy of a water jet. The velocity (v) of a fluid squirted from the nozzle 7' can be determined by the following equation using $P_2$ or the hydraulic pressure at nozzle inlet determined in step (12):

$$= \alpha \sqrt{2gP_2}$$

wherein $\alpha$: constant g: acceleration of gravity.

This formula is visualized by curve 26 in graph 16 of FIG. 2.

(14) The opening or aperture $Av$ of control valve 3 can be calculated by the following equation using the flow of concentrated solution $Q_2$ as determined in step (11) and the velocity of water jet v as determined in step (13):

$$Av = Q_2/v.$$

(15) The operating amount or stroke S of the control valve can be determined from the valve opening vs. stroke characteristics of the valve by using $Av$ determined in step (14). Graph 17 in FIG. 2 shows a typical valve opening vs. stroke profile by curve 27. A signal indicating the stroke S is fed to actuator 3b of control valve 3 through a driver 18, which, in turn, shifts the valve by stroke S to provide a valve opening corresponding to $Av$. As a result, the control valve 3 having the opening $Av$ develops system pressure and water flow equal to the values set or calculated in step (11), thereby establishing the desired level of desalinated water flow.

(C) Implementation of Control Unit 9

Control unit 9 can be realized by combining digital or analog function generators that will generate the characteristic curves shown in FIG. 2. In the simplest form, control unit 9 can be realized by a single function generator capable of generating a valve operating amount or stroke S that corresponds to the desired level of desalinated water flow setting $Q_1$. Alternatively, valve stroke S may be read by using the set input $Q_1$ to access a lookup table of memory type. In a more sophisticated form, control unit 9 can be realized by a computer including a memory storing necessary system variables, an input device, typically of either keyboard or switch type, that enters desired values to be set in the system, and a data processor that processes input data by the procedures described in Sections (A) and (B).

(iv) Modifications

In the foregoing pages, the control system of the present invention has been described by reference to an embodiment wherein the system is applied to desalination of seawater. The present system may also be used to control a process for concentrating a chemical-containing fluid by a reverse osmotic apparatus. In this case, the amount to be controlled is not the flow of desalinated water, but the flow of a concentrated solution. From the preset value of the flow of concentrated solution and according to the procedure described in Section (A) with necessary modifications that will be obvious to those skilled in the art, the discharge pressure of a centrifugal pump and other system state variables that will achieve the present level of the flow of concentrated solution can be determined.

In the reverse osmotic treatment system shown in FIG. 2, a hydraulic turbine of Pelton wheel type that is driven by a water jet from the nozzle is used as an energy recovery means. If desired, this turbine may be replaced by a reverse running pump turbine. If the system is of such a small size that energy recovery will not provide any substantial cost saving, entire omission of the turbine and using the control valve 3 to simply discharge the concentrated solution out of the system would sometimes be advisable.

The system of FIG. 2 depends on an open loop contol. If necessary, means for detecting certain system state variables (e.g. pressure or flow) may be added for confirmatory or feedback purposes. An example of such means is a sensor for detecting the discharge pressure of the centrifugal pump. The output of this sensor is compared with a calculated value of the pump discharge pressure obtained in control unit 9 to recalculate or correct the set value of pump discharge pressure so as to correct the valve opening in order that the actual pump discharge pressure developed thereby will be equal to the corrected value.

II. Minimizing Power Requirement for Pump by Using Optimum Rotational Speed

(i) Overview

The control system described in Section I presupposes that the centrifugal pump 1 runs at a predetermined rotational speed, for example, the rated rpm. The Q-H performance of a pump depends on its rotational speed. Therefore, the flow $Q_1$ of product fluid as against the pump discharge pressure $P_0$ also varies with the pump speed. The power required for driving the pump depends on both the pump speed and its discharge. According to the present invention, the rotational speed of the pump can be determined at an optimum level that minimizes the power requirement for establishing the desired level of the flow of product fluid, for example, desalinated water.

As will be understood from the description in Section I, when the pump is running at a specified speed, a maximum flow of desalinated water or $Q_{1max}$ can be provided at a specific pump discharge pressure $P_{01}$ (see pump performance curve 21 and $P_0$-$Q_1$ characteristic curve 23 in FIG. 2). The value of $Q_{1max}$ increases with higher pump speed. For a given value of $Q_0$, the power requirement for the pump to supply the fluid decreases with lower pump speed. According to the finding of the present inventors, an optimum pump speed can be found at a point on the $P_0$-$Q_1$ characteristic curve having a maximum flow of product fluid (e.g. desalinated water) $Q_{1max}$ which is equal to its desired value $Q_1$. The power requirement for the pump can be minimized by running it at this optimum speed.

Figure 4:
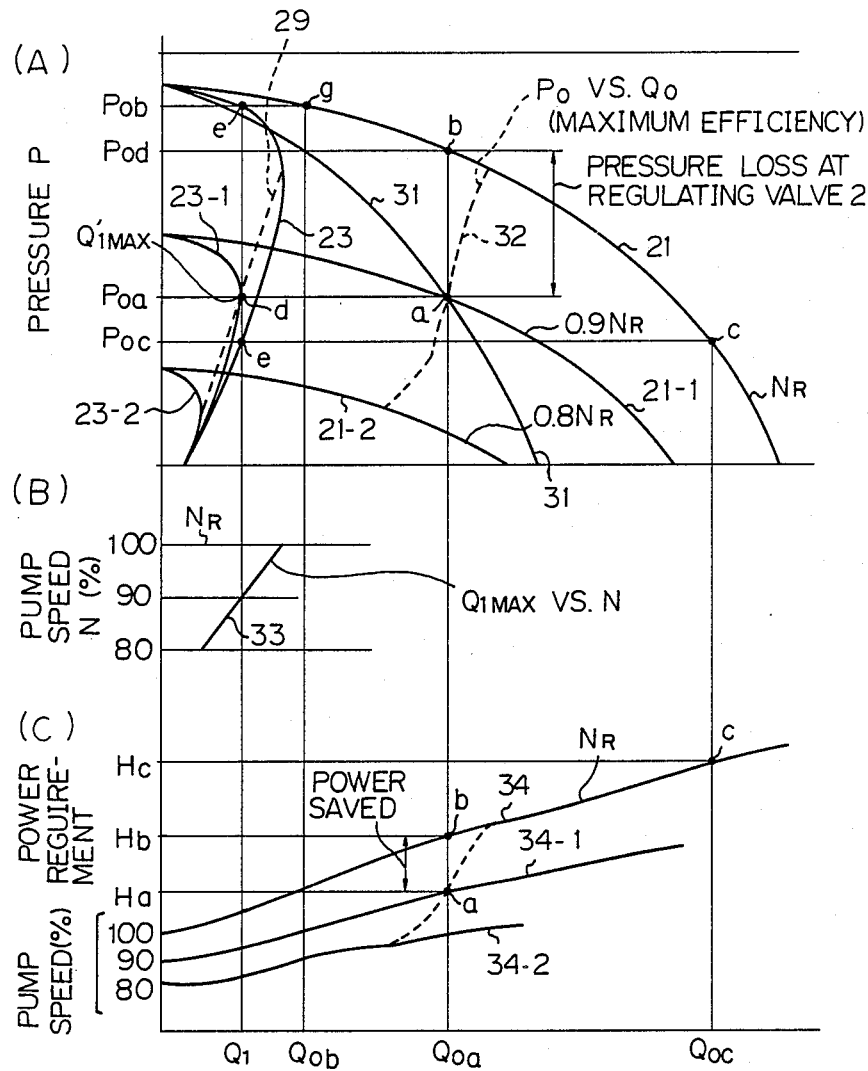
FIG. 4 contains various characteristic curves for illustrating how an optimum pump speed for achieving the desired flow of desalinated water can be determined.

(ii) Optimum speed of pump (FIG. 4)

The method of finding an optimum speed of the centrifugal pump 1 is hereunder described by reference to FIG. 4. In graph (A) of FIG. 4, curve 21 shows the Q-H performance characteristics (discharge pressure $P_0$ versus flow of feed fluid $Q_0$) of the pump at the rated speed $N_R$. Curve 23 shows the discharge pressure $P_0$ versus flow of desalinated fluid $Q_1$ characteristics at the same speed $N_R$. Curve 21-1 shows the Q-H performance characteristics of the pump at 0.9 $N_R$, whereas curve 23-1 shows the $P_0$-$Q_1$ characteristics corresponding to that curve. Similarly, curves 21-2 and 23-2 respectively show the Q-H performance characteristics of the pump and the $P_0$-$Q_1$ characteristics. A dashed line 29 shows the pump speed vs. $Q_{1max}$-$P_0$ profile that is obtained by plotting the values of maximum flow ($Q_{1max}$) on the $P_0$ vs. $Q_1$ characteristic curves for various pump speeds, namely, the values of maximum flow of desalinated water that can be provided at various pump speeds. Curve 31 shows the output characteristics of a pressure regulating valve 2 (see FIG. 1) provided on the feed line in the conventional system, and these characteristics indicate the pressure vs. flow of the primary fluid at the rated pump speed $N_R$. As will be shown later in this specification, a dashed line 32 represents optimum pump operating characteristics which are obtained by plotting the pump operating points capable of providing a maximum flow of desalinated water at various pump speeds.

Curve 33 in graph (B) of FIG. 4 corresponds to the characteristic curve 23 in graph (A) and shows the pump speed vs. maximum flow ($Q_{1max}$) profile. Curve 34, 34-1 and 34-2 in graph (C) in FIG. 4 show the relation of discharge ($Q_0$) from pump 1 and power requirement (HP) for respective pump speeds of $N_R$, 0.9 $N_R$ AND 0.8 $N_R$.

In graph (A), point (d) is on the $P_0$-$Q_1$ characteristic curve 23-1 for a pump speed of 0.9 $N_R$ and indicates the maximum flow of desalinated water $Q'_{1max}$ that is obtained by the reverse osmotic treatment system at 0.9 $N_R$, as well as the pump discharge pressure or the pressure at the inlet of the reverse osmotic apparatus $P_{0a}$ that develops when $Q'_{1max}$ is obtained. In this instance, the pump is operating at point (a) on the pump performance characteristic curve 21-1 for the same pump speed (0.9 $N_R$). This point (a) shows that the primary fluid is flowing at a rate of $Q_{0a}$. The corresponding power requirement is Ha, as indicated by point (a) on the curve 34-1. As will be understood from the description that follows, if the maximum flow $Q'_{1max}$ that is obtained at a pump speed of 0.9 $N_R$ is equal to the desired level of desalinated flow $Q_1$, 0.9 $N_R$ is the optimum pump speed at which the power requirement for the pump is minimized.

In the embodiment shown, the $P_0$-$Q_1$ characteristic curve 23 for a pump speed of $N_R$ has two points (e) and (f) at which the flow of desalinated water is equal to the maximum flow $Q'_{1max}$ for a speed of 0.9 $N_R$. Point (e) shows that the pump discharge pressure or the pressure at the inlet of the reverse osmotic apparatus has a value $P_{0d}$ which is greater than the value of $P_{0a}$ at point (d). A pump operating point corresponding to point (e) is point (g) on curve 21, and this latter point indicates that the flow of the feed fluid is $Q_{0b}$.

The recovery percentage or the ratio of the flow of product fluid (e.g. desalinated water) to the flow of feed fluid must be within a range that assures normal operation of the reverse osmotic apparatus. For the desalination system of seawater the critical recovery percentage that is tolerated by the system is generally in the range of 20 to 40%. If the system was so operated as to receive the feed fluid at a flow rate of $Q_{0b}$ (indicated by point (g)) and to provide desalinated water at a flow rate of $Q_1$ (indicated by point (e)), the recovery percentage ($Q_1/Q_{0b}$) would exceed its critical value. Therefore, the operating points (e) and (g) are excluded from the system requirements of the present invention.

The pump operating point corresponding to point (f) is point (c) on curve 21, and this point indicates that the flow of the feed fluid is $Q_{0c}$. The power requirement for providing this flow level is Hc which is indicated by point (b) on the power requirement curve 34 for a pump speed of $N_R$.

In the illustrated example, point (a) on curve 21-1 is also on curve 31 which indicates the output characteristics of the pressure regulating valve for a pump speed of $N_R$. In this case, the pressure at the inlet of the reverse osmotic apparatus is $P_{0a}$ and the flow of the fluid that is fed to the reverse osmotic apparatus is $Q_{0a}$. The flow of the desalinated water produced is equal to the value indicated by point (d) on curve 23-1 ($P_0$-$Q_1$ characteristic curve for a speed of 0.9 $N_R$) that corresponds to pump operating point (a). This is because, in both cases, the fluid being fed into the reverse osmotic apparatus has the same pressure and flow. The pump operating point which corresponds to print (a) associated with the pressure regulating valve is found at point (b). Therefore, it can be seen that the pressure regulating valve has caused a pressure drop equal to the difference between $P_{0d}$ indicated by point (b) and $P_{0a}$ indicated by point (a). The power requirement corresponding to the pump operating point (b) in graph (A) has a value Hb indicated by point (b) on the power requirement curve 34 in graph (C). The value Hb indicates the power required to provide a flow of desalinated water $Q_1$ from the system which is operated at a pump speed of $N_R$ using the second pressure regulating valve positioned on the feed line. The value Ha which is smaller than Hb and is indicated by point (a) on curve 34-1 refers to the power required to provide the same flow of desalinated water when the system is operated at a pump speed of 0.9 $N_R$ and without using the second pressure regulating valve.

As will be understood from the foregoing description, in order to minimize the power necessary for providing the desired level of the flow of product fluid or desalinated water, the system may be operated at an optimum pump speed where the point of the maximum flow of desalinated water on the corresponding $P_0$-$Q_1$ characteristic curve is equal to the desired flow level. The pump runs at a specific operating point on the Q-H performance curve associated with that point of the maximum flow of desalinated water, and its discharge pressure is regulated by the single valve posiitoned downstream of the reverse osmotic apparatus.

An example of the procedure for determining the optimum pump speed is hereunder described.

(1) Prepare data on the maximum flow of desalinated water vs. pump discharge pressure for various pump speeds, as illustrated by curve 29 in FIG. 4.

(2) Set the flow of desalinated water at a desired level.

(3) Scan the data prepared in step (1) and compare the maximum flow of desalinated water for each of the checked pump speeds with the desired level of the flow of desalinated water.

(4) Select a maximum flow of desalinated water which is closest to the desired level. Optimum pump speed is the value that corresponds to this selected maximum flow of desalinated water. The pump discharge pressure is determined at the same time.

The above procedure presupposes that the recovery percentage is held within the tolerable range when the system is operated at any maximum flow point on the $P_0$-$Q_1$ characteristics (e.g. point (d) on curve 23-1 in FIG. 4). If this requirement is not met by the reverse osmotic apparatus used, necessary modifications must be made to the data prepared in step (1) so that the recovery percentage of the modified data is within the tolerable limits. More specifically, the flow of desalinated water for the maximum recovery percentage tolerated by the specific reverse osmotic apparatus is selected as the maximum flow of desalinated water.

A means for determining the optimum speed of the centrifugal pump can be realized by a digital or analog function generator which, in response to an input signal indicative of the desired level of the flow of desalinated water, produces a signal indicative of the optimum pump speed. Once the optimum pump speed and pump discharge pressure corresponding to the desired preset level cf the flow of desalinated water are determined, the opening of the valve necessary for establishing the so determined pump discharge pressure can be automatically determined by the procedure described in Section I, (iii)(B).

Figure 5:
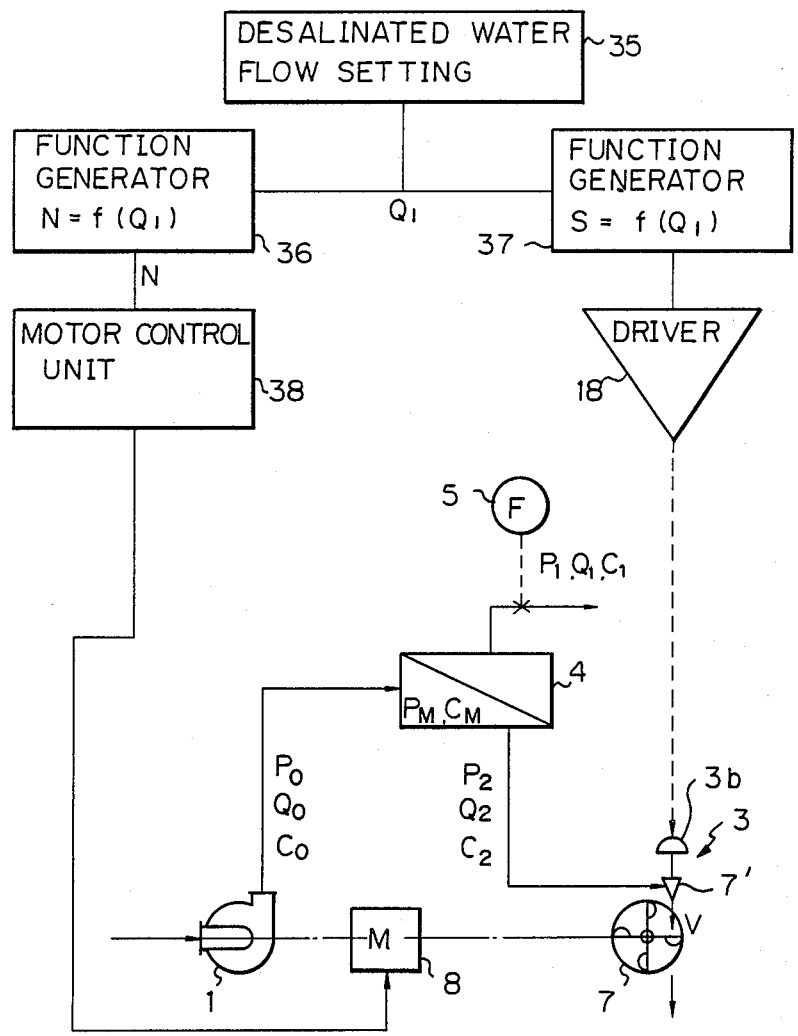
FIG. 5 is a diagram showing a control for use with a reverse osmotic treatment system which includes a means for controlling the pump to run at an optimum speed according to the present invention.
Figure 6:
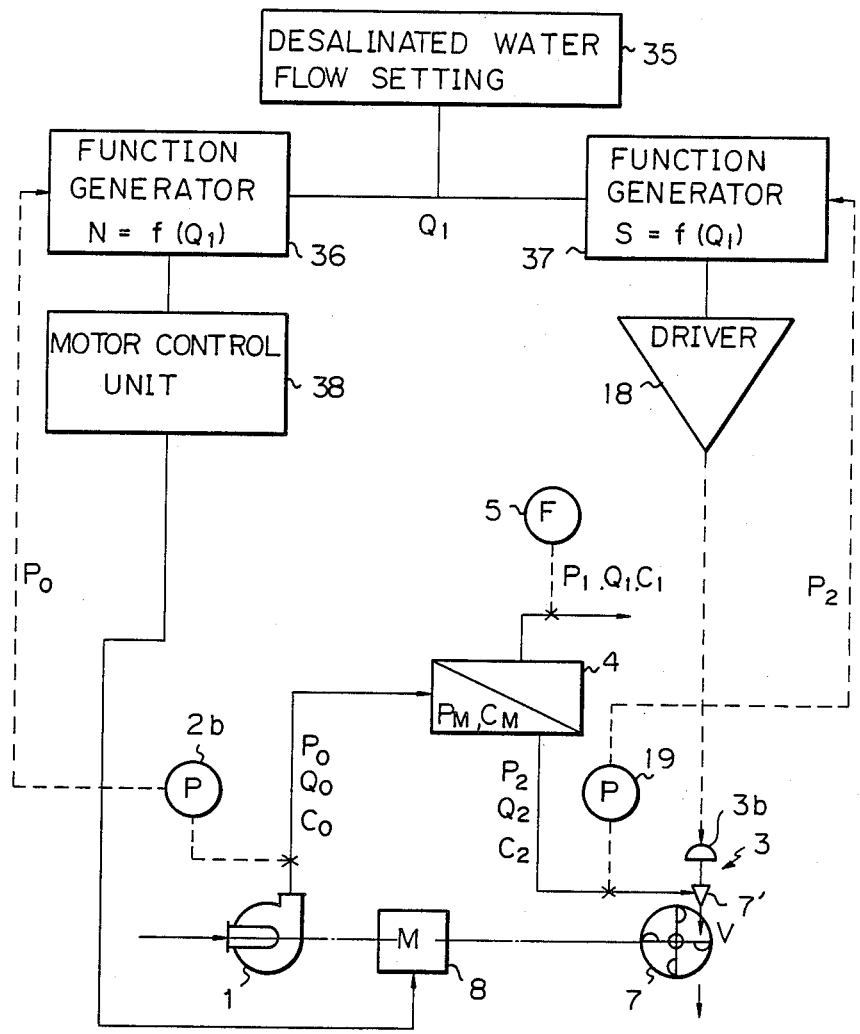
FIG. 6 is similar to FIG. 5 and shows a control having feedback elements.

(iii) Control at optimum pump speed (FIGS. 5 and 6)

FIG. 5 is a block diagram of the control unit for the reverse osmotic treatment system that is operated by the principle of the present invention that has been described by reference to FIG. 4. Reference numeral 35 represents an input device, typically of keyboard type, which provides a setting of the desired level of the desalinated water flow $Q_1$. A device 36 is a function generator which produces a signal indicative of the optimum pump speed N in response to the signal that has been entered from input device 35 and which indicates the desired level of the flow of desalinated water $Q_1$. In response to this command, motor speed control 38 coupled to the function generator controls a centrifugal pump driving motor 8 so that it rotates at optimum speed. Reference numeral 37 represents a function generator which, in response to the signal that has been entered from input device 35 and which indicates the desired flow level $Q_1$, produces the value of the stroke which is a function of $Q_1$ and by which the valve 3 positioned downstream of the reverse osmotic apparatus must be shifted. The function generator 37 provides a command through a driver 18 to an actuator 3b of the valve 3 positioned on the secondary line and causes the valve to shift by the stroke indicated by said command. As a result, the system produces desalinated water at the desired flow rate $Q_1$ while the pump is running at the optimum speed and the fluid pressure is established by the valve 3. A flowmeter 5 is not essential to the present invention but may be used to measure the actual flow of desalinated water for confirmatory purposes.

FIG. 6 shows a modification of the apparatus of FIG. 5. This modification is primarily characterized by a pressure sensor 2b that is provided on the supply or primary line for detecting the pressure of the fluid flowing through that line. This sensor 2b produces a signal indicative of the actual discharge pressure of the pump $P_0$(REAL), which is fed back to the optimum pump speed generator 36. The generator 36 may include means for comparing the actual discharge pressure (as detected by sensor 2b) with the calculated pressure stored in the generator 36. In response to the result of this comparison, a pressure recalculating means (not shown) in the generator 36 modifies or updates the calculated pressure so that the recalculated value agrees with the actual pressure.

Similarly, the concentration or secondary line is provided with a pressure sensor 19 for detecting the pressure of the fluid flowing through that line. This sensor 19 feeds back to the stroke generator 37 a signal indicative of the actual pressure of the concentrated fluid $P_2$(REAL). The stroke generator 37 recalculates the pressure so that the recalculated pressure is in agreement with the actual pressure.

The control system of FIG. 6 has the advantage that it provides more precise system state variables. Each of the pressure sensors used as feedback elements may be replaced by a flowmeter. However, the use of a flowmeter is not cost effective since it is fairly expensive. A single feedback element rather than a plurality of elements may be used. For example, one of the primary and secondary fluid pressure sensors 2b and 19 may be omitted.

Any conventional driving means for the centrifugal pump, such as engine, gas turbine and etc. can be substituted for the motor 8.

III. Monitoring the Performance of Each of the Components of the Reverse Osmotic Treatment System, Evaluating the Degree of Deterioration of Its Performance, and Identifying the Type of Specific Trouble

(i) Overview

The description in Sections I and II assumes that the system is operating under normal conditions and provides constant performance characteristics. This will justify the use of a predetermined constant as the membrane performance index $K_o$, and a predetermined pattern for the Q-H characteristic curve of the centrifugal pump. However, in the actual operation of the system, its performance will deteriorate for one reason or another. According to the present invention, there are provided devices that monitor the performance of the respective components of the system and determine the degree by which their performance was deteriorated.

It is the understanding of the present inventors that the overal performance of the reverse osmotic treatment system is governed by the performance of three major components, i.e. the centrifugal pump, the membranes in the reverse osmotic apparatus and the fluid channels, and the deterioration of the last mentioned component is evaluated in terms of pressure loss. According to the finding of the present inventors, the deteriorations of these three components can be separately identified by comparing a combination or pattern of the state levels (pressure and/or flow) of the primary and secondary fluid passing through the feed or primary and secondary or concentration line in the reverse osmotic treatment system with a combination or pattern of the state levels of the fluid under normal or ideal operating conditions. The results of these comparisons are summarized in the following Decision Table I.

DECISION TABLE I

| Fluid state levels (primary line) | Fluid state levels (secondary line) | Phenomenon |
| --- | --- | --- |
| $P_0 < P_0'$ or $Q_0 > Q_0'$ | $P_2 < P_2'$ or $Q_2 < Q_2'$ | Low membrane performance in reverse osmotic apparatus |
| $P_0 < P_0'$ or $Q_0 > Q_0'$ | $P_2 > P_2'$ or $Q_2 > Q_2'$ | Clogged flow channel (inclusive of inner flow passages in reverse osmotic modules) |
| $P_0 > P_0'$ or $Q_0 > Q_0'$ | $P_2 > P_2'$ or $Q_2 > Q_2'$ | Low poump performance |

Notes:
A state level without prime indicates the value under normal conditions. For example, $P_0$ indicates the fluid pressure on the primary line under normal conditions. A state level with a prime indicates a value other than the normal value which is due to a change in the performance of a certain component.
$P_0$, $P_0'$: pressure of fluid in the primary line
$P_2$, $P_2'$: pressure of fluid in the secondary line
$Q_0$, $Q_0'$: flow of fluid in the primary line
$Q_2$, $Q_2'$: flow of fluid in the secondary line.

The embodiment to be shown hereinafter uses a means for detecting the pressure of a fluid flowing through the primary or supply line, and a means for detecting the pressure of a fluid flowing through the secondary or concentration line. Each of the detected values of pressure is compared with the value calculated for normal operating conditions. The results of the comparison will identify which system component has experienced a deterioration in performance. Also disclosed are devices for evaluating the degree by which the performance of respective components (e.g. the Q-H performance curve of the centrifugal pump, the membrane performance index, fluid pressure loss index) of the system has deteriorated.

More specifically, the performance monitor or evaluating apparatus according to the present invention provides the latest information about the performance of the respective components of the control system. By using this information, the control systems shown in FIGS. 2, 5 and 6 are able to maintain the flow control with high accuracy.

If the performance of a certain component is greatly deteriorated and its operation is found to be abnormal, the entire system is preferably shut down for the purpose of inspecting, repairing and/or replacing that defective component. In the embodiment to be shown hereinafter, this object is achieved by using a means that issues a visible and/or audible alarm in response to a signal indicative of the abnormality of a certain component.

(ii) Devices for Detecting the Deterioration of the Membrane Performance, Determining the Deteriorated Membrane Performance Index, and Monitoring the Membrane Performance FIG. 7 is generally the same as FIG. 2 and shows a control unit 9 having the same capabilities as those of the control unit shown in FIG. 2. Reference numeral 2 denotes a pressure sensor that is provided on the supply or primary line for detecting the pressure of the primary fluid. Reference numeral 6 refers to a pressure sensor which is provided on the secondary or concentration line for detecting the pressure of the concentrated fluid. The detection signals from these sensors are fed to various performance monitors (FIGS. 8, 10 and 12), as well as trouble type identifying and alarm devices (FIG. 13), all of which can be incorporated in the control unit 9 (but not shown in FIG. 7). Each of the graphs in FIG. 7 shows the characteristics of a deteriorated membrane in the reverse osmotic apparatus as compared with those of the normal membrane.

For better understanding of the present invention, the following description assumes that the opening $A_v$ of valve 3 under normal conditions is the same as the value under such conditions where the overall performance of the system has changed as a result, for example, of deteriorated membrane performance. Similarly, two system state levels (e.g. $P_2$ and $P_2'$) shall be compared at the same fluid temperature by using the necessary temperature compensation (temperature calibration for fluids having different temperatures).

(A) Detecting a Drop in the Membrane Performance (1) As stated in Section I, $Q_1$ or the flow of desalinated water produced from the reverse osmotic apparatus is given by:

$$Q_1 = A_M K \Delta P.$$

The factor K is a performance index to be determined by the shape, properties and temperature of the semipermeable membrane. This index represents the amount of desalinated water produced per unit area of the membrane ($A_M = 1$) and unit reverse osmotic pressure ($\Delta P = 1$). The performance index K is given by:
$K = K_o(D_w/T)$.
The term $D_w/T$ on the right side of this equation is a temperature-dependent quantity which increases with temperature as illustrated by graph 13 in FIG. 2. The term $K_o$ is a performance index that is not dependent on temperature, and this index decreases as the performance of the membrane is deteriorated.

In graph 15 of FIG. 7, a solid line 25 shows the osmotic pressure vs. flow of dsalinated water characteristics of the normal semipermeable membrane. For a given temperature, if the performance of the membrane is deteriorated and the production of desalinated water is subsequently reduced, the characteristics of the membrane change to those indicated by the dashed line. When the performance of the membrane deteriorates, the flow of desalinated water decreases whereas that of concentrated solution increases. In FIG. 7, $Q_1$ represents the flow of desalinated water under normal conditions, $Q_1'$ the flow with deteriorated membrane performance, whereas $Q_2$ indicates the flow of concentrated solution under normal conditions, and $Q_2'$ the flow with deteriorated membrane performance. Therefore, the following relations can be derived:

$$Q_1 > Q_1' \text{ and } Q_2 < Q_2'.$$

When these relations are satisfied, the performance of a membrane in the reverse osmotic apparatus may well be regarded as having deteriorated.

(2) In the discussion of this section (ii), the opening $A_v$ of valve 3 is assumed to be constant. Therefore, when the flow of concentrated solution increases, the velocity of the water jet issuing from the nozzle 7' and the pressure of the concentrated solution are increased from v to v', and from $P_0$ to $P_2'$, respectively, as illustrated in graph 16. Therefore, $$P_2 < P_2' \text{ and } v < v'.$$

(3) The pressure loss of the fluid in the line ($P_L = P_{L1} + P_{L2}$) fluctuates less than the degree by which the pressure of the concentrated solution is increased, and therefore, the discharge pressure of the pump or the pressure of the solution in the primary line is also increased. Stated mathematically, $$P_0' < P_0$$

wherein $P_0$ is the discharge pressure of the pump with normal membrane, and $P_0'$ is the value with a deteriorated membrane.

(4) To summarize the pressure relations determined in (2) and (3);

$$P_0 < P_0' \text{ and } P_2 < P_2'.$$

The trouble identifying device according to the present invention which will be described later (FIG. 13) identifies certain trouble as a drop in the performance of the semipermeable membrane when the device detects the relations shown above.

(B) The performance index $K_0'$ of the deteriorated membrane is determined by the following procedure.

(1) The velocity V' of a water jet issuing from nozzle 7' with the deteriorated membrane is determined by solving the correlation:

$$V' = a \sqrt{2gP_2'}$$

using $P_2'$ which is the hydraulic pressure in the secondary line and detected by pressure detector 6.

(2) The flow of concentrated fluid $Q_2'$ with the deteriorated membrane is determined by solving $Q_2' = A_v V'$ using the valve aperture $A_v$ and the velocity V' determined in step (1).

(3) The pump discharge or the flow of fluid in the primary line $Q_0'$ is determined from the performance characteristics of the pump (see curve 21 in FIG. 7) using the detected pump discharge pressure $P_0'$.

(4) The flow of desalinated water $Q_1'$ is determined by solving $Q_1' = Q_0' - Q_2'$ using $Q_0'$ and $Q_2'$ determined in steps (2) and (3).

(5) Pressure loss in the primary line $P'_{L1}$ is determined either empirically or by solving $P'_{L1} = a_1(Q_0')^2$ using $Q_0'$ determined in step (3). In the calculation formula, $a_1$ is the pressure loss coefficient for the primary line. If desired, a constant may be used for $P'_{L1}$ since the pressure loss occurring in the primary line is typically about 1/50 of the discharge pressure of the pump.

(6) The pressure $P'_M$ that is applied on the surface of a semipermeable membrane in the reverse osmotic apparatus is determined by solving $P'_M = P_0' - P'_{L1}$ using $P'_{L1}$ determined in step (5) and the pump discharge pressure $P_0'$ detected by pressure sensor 2.

(7) The concentration of the secondary solution $C_2'$ is determined by solving $C_2' = C_0 \cdot Q_0'/Q_2'$ using $Q_2'$ and Q determined in steps (2) and (3).

(8) The average concentration $C'_M$ of the feed solution in contact with the surface of a semipermeable membrane in the reverse osmotic apparatus is determined by solving the approximation: $C'_M = (C_0 + C_2')/2$ using the constant for the concentration of seawater $C_0$ and the concentration of the secondary solution $C_2'$ adetermined in step (7). A better approximation may be used if a more accurate value of $C'_M$ is desired.

(9) The osmotic pressure $\pi'_M$ is determined from $C'_M$ determined in step (8) by using the concentration ($C_M$) vs. osmotic pressure $\pi_M$ characteristics (curve 24 in FIG. 7).

(10) The reverse osmotic pressure $\Delta P'$ is determined by solving $\Delta P'=(P'_M-P_1)-(\pi'_M-\pi_1)$ using $P_1$ the constant for the pressure of desalinated water, $\pi_1$ the constant for the osmotic pressure of desalinated water, $\pi'_M$ determined in step (9) and $P'_M$ determined in step (6).

(11) The temperature-dependent membrane performance index $K'$ is determined by solving $K'=Q'_1/A_M\Delta P'$ using $Q_1$ determined in step (4), $A_M$ the constant for the membrane area, and $\Delta P'$ determined in step (10).

(12) The degree of deterioration of the performance of a membrane in the reverse osmotic apparatus is determined by calculating the ratio of $K'$, the performance index of deteriorated membrane, to $K$, the performance index of the normal membrane for the same temperature. Alternatively, $K_0'$ or the membrane performance index which is not dependent on temperature may be determined by solving $K_0'=K/(D_w/T)$ wherein $(D_w/T)$ is a calculated value obtained from the temperature T detected by the temperature detector 3. In this latter case, the degree by which the performance of the membrane has deteriorated can be determined by calculating $K_0'/K_0$ using the performance index of the normal membrane $K_0$.

Figure 8B:
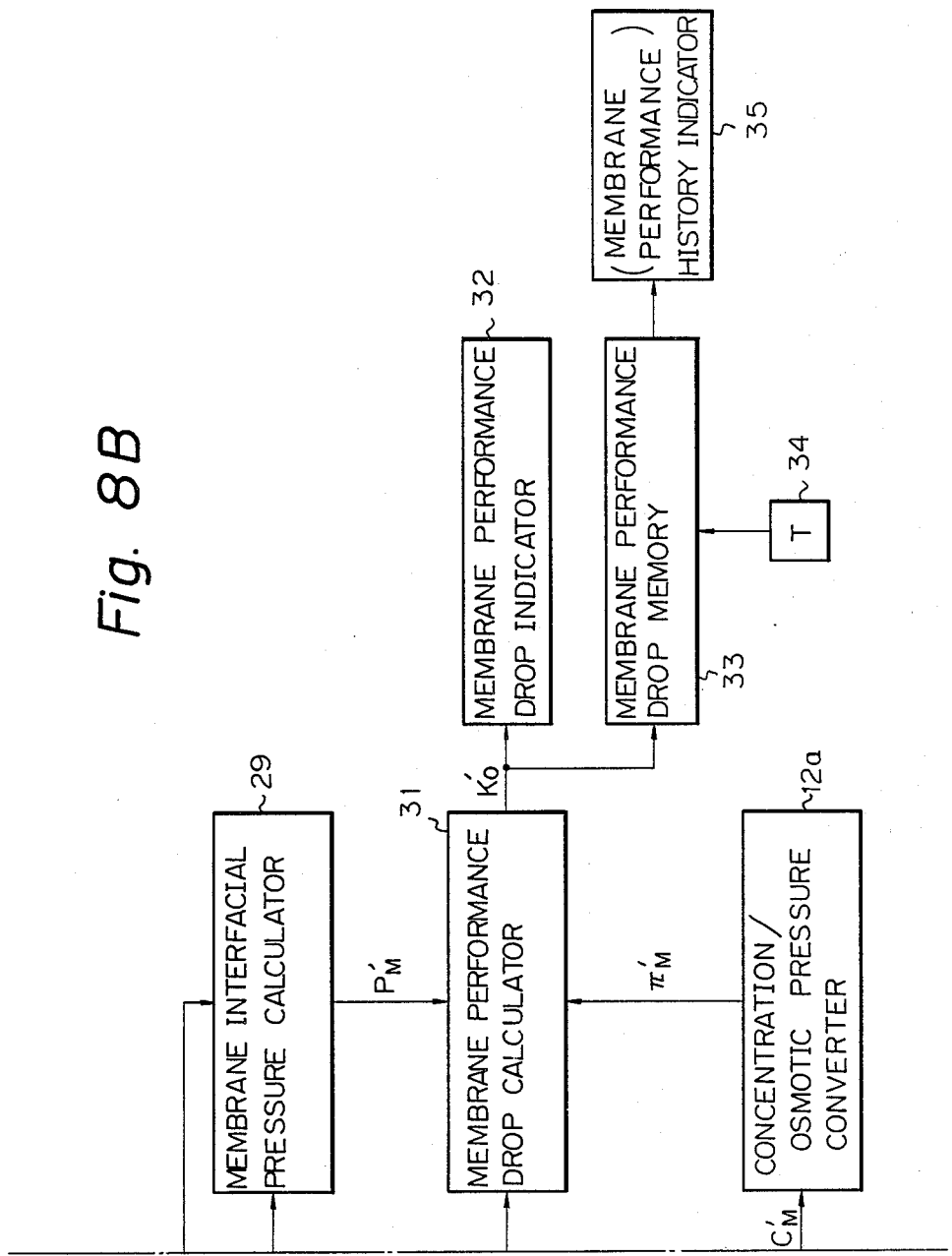
FIG. 8 is a block diagram of a device for monitoring the performance of the reverse osmotic apparatus.

(C) Membrane Performance Monitor (FIG. 8)

FIG. 8 is a block diagram of the tracking device according to the present invention which monitors the performance of the membrane by the procedure described in (B). The pressure $P_0'$ of the fluid in the feed line to a semipermeable membrane in the reverse osmotic apparatus is detected by detector 2, which sends the detected information into a pressure/flow converter 11a. The converter 11a converts the pump discharge pressure or the pressure of the feed fluid $P_0'$ to the corresponding flow of the feed fluid $Q_0'$ in accordance with the Q-H characteristics of the pump (as indicated by curve 21 in FIG. 7). The pressure detector 2 also sends the signal $P'_0$ to a membrane interfacial pressure calculator 29 in the tracking device or monitor. The calculator 29, in response to both the signal $P'_0$ and the feed fluid flow signal $Q'_0$ from the pressure/flow converter 11a, produces a membrane interfacial pressure signal $P'_M$ in accordance with the correlation $P'_M=P'_0-P'_{LI}=P'_0-a_f(Q'_0)^2$. A second pressure detector 6 detects the pressure of the fluid in the concentration line from the reverse osmotic apparatus, and sends the detected signal to a concentrate flow calculator 6b in the tracking device. Using $P'_2$ and the present value of valve aperture $A_v$ supplied from the control unit of the type as shown in FIG. 2, the calculator 6b produces a signal $Q'_2$ in accordance with the correlation $$Q_2' = A_v \alpha \sqrt{2gP_2'}.$$

A desalinated water flow calculator 30, in response to signal $Q'_0$ from 11a and signal $Q'_2$ from 6b, determines the flow of desalinated water $Q'_1$ in accordance with the correlation $Q'_1=Q'_0-Q'_2$. A membrane interfacial concentration calculator 6c, in response to signal $Q'_0$ from converter 11a and signal $Q'_2$ from calculator 6b, produces a membrane interfacial concentration $C'_M$ in accordance with the correlation $C'_M=C_0\cdot(1+Q'_0/Q'_2)/2$. A concentration/osmotic pressure converter 12a, in accordance with the concentration/osmotic pressure characteristics (see curve 24 in FIG. 7), converts the membrane interfacial concentration signal $C'_M$ to the corresponding osmotic pressure signal $\pi'_M$. A membrane performance drop calculator 31, in response to the membrane interfacial pressure signal $P'_M$, desalinated water flow signal $Q'_1$ and osmotic pressure signal $\pi'_M$ respective means 29, 30 and 12a, determines a membrane performance index $K'$ in accordance with the correlations $\Delta P'=(P'_M-P_1)-(\pi'_M-]P'$. The calculator 31, further in response to a temperature signal T from a temperature signal 14 (FIG. 9), determines a temperature-independent membrane performance index $K_0'$ in accordance with the correlation $K_0'=K'/(D_w/T)$. If desired, the calculator 31 may be so designed that it also responds to the reference membrane performance index $K_0$ having the normal value and being stored in the control unit, and calculates $K_0'/K_0$ or the ratio of the present performance index to the normal performance index. This ratio represents the degree by which the performance of the membrane has deteriorated. Calculator 31 sends signal $K_0'$ and/or $K_0'/K_0$ to an indicator 32, which then indicates the present value of the membrane performance index and/or the degree by which the performance of the membrane has dropped.

A memory 33 can be loaded with the membrane performance index $K_0$ and/or the performance drop $K_0'/K_0$ from the calculator 31 periodically, at intervals selected by a timer 34. A history indicator 35 indicates the history of the membrane performance on the basis of the data read from the memory 33.

(iii) Detecting a Drop in the System Performance Due to Scale Deposit in the Fluid Channel, and Device for Monitoring the Pressure Loss in the Channel FIG. 9 which is essentially the same as FIG. 2 illustrates various fluctuations in the system state levels that will occur when the system fluid channel is clogged by scales formed from components of the fluid.

Particularly the inner passages of the reverse osmotic modules would be most easily clogged. The clogged channel increases the pressure loss of the fluid and this eventually downgrades the performance of the entire system.

(A) Detecting a Drop in System Performance Due to a Clogged Channel

When some part of the system channel is clogged, the discharge pressure of the pump is increased and the discharge from the pump is decreased (see graph 11 in FIG. 9). When the pump discharge pressure and pump discharge under normal conditions are expressed by $P_0$ and $Q_0$, whereas the respective values in the case of line clogging are expressed by $P_0'$ and $Q_0'$, the following relations are established: $P_0<P_0'$ and $Q_0>Q_0'$.

When the discharge from the pump decreases, the membrane interfacial concentration $C_M$ increases to a value $C'_M$. When membrane interfacial concentration is increased, the osmotic pressure of the feed fluid in contact with the semipermeable membrane is increased to a value $\pi'_M$. This will be seen from the characteristic curve 24 in FIG. 9. The corresponding change in the reverse osmotic pressure $\Delta p$ is very small since the increase in the pump discharge pressure (or the pressure of the feed fluid) is cancelled by the increase in the osmotic pressure of the feed fluid in contact with the membrane. Therefore, the change in the flow of desalinated water is also very small. When $Q_1$ and $Q_1'$ are respectively written for the flow of desalinated water under normal conditions and the flow of desalinated water in the case of channel clogging, $Q_1$ is substantially equal to $Q_1'$. This causes a decreases in the flow of the secondary fluid or concentrated solution, as in represented by the inequality $Q_2 > Q_2'$ (wherein $Q_2$ is the flow of the concentrated solution under normal conditions, and $Q_2'$ is the flow of that solution in the case of channel clogging). Since in this Section the valve opning $A_v$ is assumed to remain the same irrespective of the system performance, the decrease in the flow of the concentrated solution causes a decrease in the pressure thereof. This is expressed by $P_2 > P_2'$ (wherein $P_2$ is the pressure of the concentrated solution under normal conditions and $P_2'$ is the corresponding value in the case of channel clogging). Also, the velocity of the water jet issuing from the nozzle is decreased from V to V'.

As will be understood from the foregoing description, a line clogging can be detected by checking to see if one of the following two sets of relations is satisfied:

$P_0 < P_0'$ and $P_2 > P_2'$, or $Q_0 > Q_0'$ and $Q_2 22\ A_2'$.

(B) Procedure for Determining the Pressure Loss of Fluid in a Channel (1) Use output $P'_2$ from detector 6 to determine the velocity of water jet from the nozzle V' by the procedure described in (A).

(2) Determine the flow of concentrated solution $A_2'$ from the present value of valve opening $A_v$ by the procedure described in (A).

(3) Use the pump discharge pressure $P_0'$ from detector 2 to determine the pump discharge (or flow of the feed fluid) $Q_0'$ in accordance with the Q-H characteristics of the pump.

(4) Determine the flow of desalinated water $Q_1'$ from $Q_2'$ and $Q_0'$.

(5) Determine the reverse osmotic pressure $\Delta P'$ by solving $\Delta P' = Q_1'/A_M \cdot K$.

(6) Determine the membrane interfacial concentration $C'_M$ by solving $C'_M = C_0 \cdot (1 + Q_0'/Q_2')/2$.

(7) Use $C'_M$ to determine the osmotic pressure $\pi'_M$ of the feed fluid in contact with the semipermeable membrane.

(8) Derive the membrane interfacial pressure $P'_M$ by solving $P'_M = \Delta P' + (\pi'_M - \pi_1) + P_1$.

(9) Use $P_0'$ and $P'_M$ to determine the pressure loss of the fluid in the supply line $P'_{L1}$.

(10) Use $P_2'$ and $P'_M$ to determine the pressure loss $P'_{L2}$ in the secondary or concentration line.

(11) Determine the primary and secondary pressure loss coefficients $a_1'$ and $a_2'$ by solving $a_1' = P'_{L1}/(Q_0')^2$ and $a_2' = P'_{L2}/(Q_2')^2$, respectively.

(C) Device for Tracking or Monitoring Pressure Loss

Figure 10B:
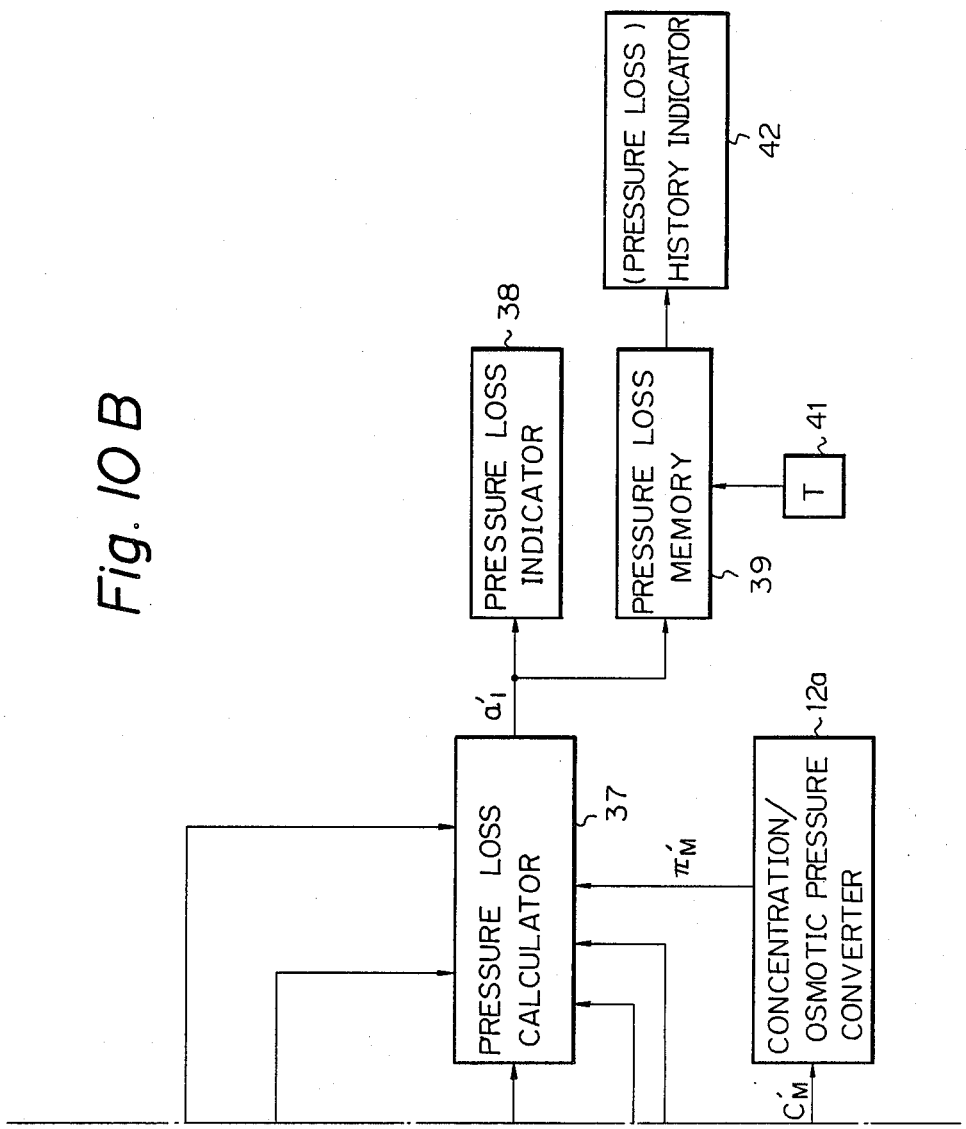
FIG. 10 is a block diagram of a device for monitoring the pressure loss in fluid channels.

FIG. 10 is a block diagram of the device according to the present invention for evaluating the degree of channel clogging by monitoring the pressure loss in the channel.

A feed pressure detector 2 sends a signal $P_0'$ to a pressure/flow converter 11a in the monitor. The converter 11a determines the feed flow $Q_0'$ in accordance with the Q-H characteristics of the pump. A concentrate pressure detector 6 sends a signal $P_2'$ to a concentrate flow calculator 6b, which derives the concentrate flow $Q_2'$ in the manner described in (B). In response to the feed flow signal $Q_0'$ from converter 11a and the concentrate flow signal $Q_2'$ from calculator 6b, a calculator 30 determines the flow of desalinated water $Q_1'$ in accordance with the correlation $Q_1' = Q_0' - Q_2'$. In response to the feed flow signal $Q_0'$ from converter 11a and the concentrate flow signal $Q_2'$ from converter 6b, a calculator 6c determines the average concentration $C'_M$ of the feed fluid at the interface with the semipermeable membrane in accordance with the ccrrelation $C'_M = C_0 \cdot (1 + Q_0'/Q_2')/2$. In response to the membrane interfacial concentration signal $C'_M$ from the calculator 6c, a converter 12a determines the corresponding average osmotic pressure $\pi'_M$ of the feed solution in contact with the semipermeable membrane in accordance with the concentration vs. osmotic pressure characteristics. In response to the feed pressure $P_0'$ from detector 2, the concentrate pressure $P_2'$ from detector 6, feed flow $Q_0'$ from converter 11a the desalinated flow $Q_0'$ from calculator 30 the concentrate flow $Q_2'$ from converter 6b and the average osmotic pressure $\pi'_M$ from converter 12a, a calculator 37 calculates parameters that are associated with the pressure loss in the channel. First, the calculator 37 derives the reverse osmotic pressure $\Delta P'$ in accordance with the correlation $\Delta P' = Q_1'/A_M \cdot K$ wherein $A_M$ is the constant for the area of the semipermeable membrane, K is the membrane performance index calibrated by using the fluid temperature T fed from the temperature detector 14 in FIG. 9, and $Q_1'$ is the desalinated water flow signal send from the calculator 30. Uisng the derived reverse osmotic pressure $\Delta P'$, the osmotic pressure $\pi'_M$ from converter 12a, the constant for the osmotic pressure of desalinated water $\pi_1$, and the constant for the pressure of desalinated water $P_1$, the calculator 37 also determines the pressure of the feed solution in the semipermeable membrane $P'_M$ in accordance with the correlation $P'_M = \Delta P' + (\pi'_M - \pi_1) + P_1$. Using the so determined pressure $P'_M$, signal $P_0'$ from the detector 2 and signal $Q_0'$ from converter 11a, the calculator 37 derives the coefficient $a_1'$ for the pressure loss of the fluid in the feed line extending to the membranes in respective RO modules in accordance with the correlation $a_1' = (P_0' - P'_M)/(Q_0')^2$. The coefficient $a_1'$ can be used as a measure for the clogging of the feed line. In a like manner, the calculator 37 uses the pressure $P'_M$, signal $P_2'$ from the detector 6 and signal $Q_2'$ from the calculator 6b, in order to calculate the coefficient $a_2'$ for the pressure loss of the fluid in the secondary (or concentration) line in accordance with the correlation $a_2' = (P'_M - P_2')/(Q'_2)^2$. The coefficient $a_2'$ can be used as a measure for the clogging of the secondary line.

The coefficients $a_1'$ and $a_2'$ can be used as a final output from the calculator 37. At the same time, or alternatively, the calculator 37 may produce the sum of these two coefficients $(a' = a_1' + a_2')$ as its output. The output of the calculator 37 is fed to a pressure loss indicator 38, which then indicates the present value of the coefficient for the pressure loss of the fluid. The output of the calculator 37 may also be used as a input which is loaded into a memory 39 periodically at intervals selected by a timer 41. The data read from the memory 39 is sent to a history indicator 42, which then indicates the history of the pressure loss that has occurred in the system channel.

Figure 11:
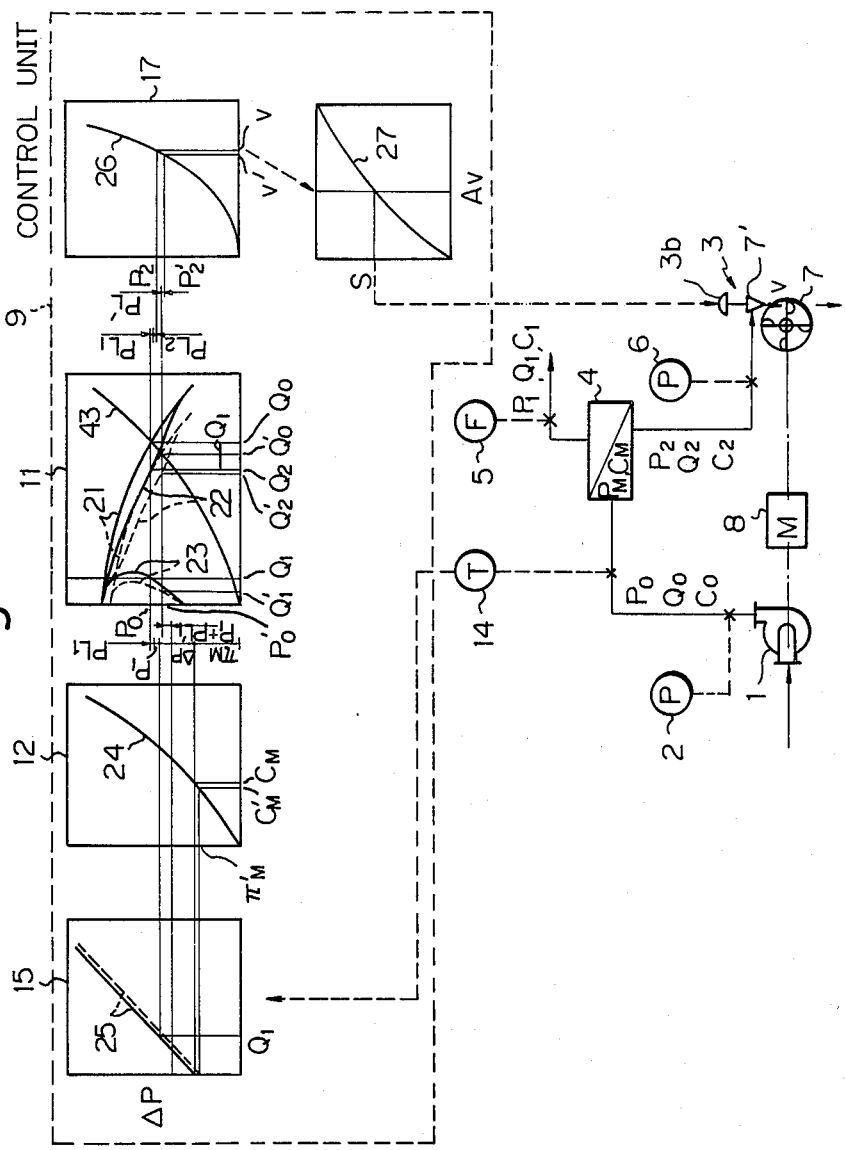
FIG. 11 s generally the same as FIG. 2 and illustrates the characteristics for the case of a deteriorated centrifugal pump, in comparison with those for the normal pump.

(iv) Detecting a Drop in the Performance of the Pump, and Device for Determining the Degree of Deterioration and Monitoring the Pump Performance FIG. 11 is generally the same as FIG. 2 and each of the graphs shown in the control unit 9 illustrate the characteristics for the case of the deterioration of the pump performance, as compared with those for the normal pump.

(A) Detecting a Drop in the Pump Performance

When the performance of the centrifugal pump 1 has deteriorated, the solid line 21 showing the normal Q-H characteristics shifts to the dashed line 21 as shown in FIG. 11. If $P_0$ and $Q_0$ respectively designate the normal pressure in the primary line (normal pump discharge pressure) and the normal flow of the fluid in the primary line (normal pump discharge) for the fluid temperature T and nozzle opening $A_v$, these system state levels decrease along a system operating characteristic curve 43 (for fluid temperature T and nozzle opening $A_v$) when the performance of the pump has deteriorated. In other words:

$$P_0 > P_0' \text{ and } Q_0 > Q_0'$$

wherein $P_0'$ and $Q_0'$ are the discharge pressure of the pump and its discharge for the case where the pump performance has deteriorated. When these relations are established, the flow of desalinated water is decreased (see dashed curve 23). Therefor, $Q_1 > Q_1'$ (wherein $Q_1$ is the flow of desalinated water under normal pump conditions, and $Q_1'$ is the value for the case of the deterioration of the pump performance). In a similar manner, the flow of concentrated solution is decreased as $Q_2 > Q_2'$ (wherein $Q_2$ is the flow of concentrated solution under normal pump conditions, and $Q_2'$ is the value for the case of the pump deterioration). Since the valve opening is assumed to remain the same irrespective of the system performance, the decrease in the flow of the concentrated solution causes a decrease in the velocity of the fluid passing through the nozzle (see graph 17 in FIG. 11), as indicated by the relation $V > V'$ (wherein V is the velocity of the fluid passing through the nozzle under normal pump conditions, and $V'$ is the value for the case of the pump deterioration).

The decrease in the velocity of the fluid passing through the nozzle is caused by a decrease in the pressure of the fluid in the secondary line, as $P_2 > P_2'$ (wherein $P_2$ is the pressure of the fluid in the secondary line under normal pump conditions, and $P_2'$ is the value for the case of the pump deterioration).

As will be readily understood, when the performance 35 of the pump has deteriorated, one of the following two sets of relations is valid: $P_0 > P_0'$ and $P_2 > P_2'$, or $Q_0 > Q_0'$ and $Q_2 > Q_2'$. The second set of relations for the fluid flow happens to be the same as those which are established when some part of the system channels is clogged. The first set of relations for the fluid pressure is unique to deterioration of the pump performance. Therefore, by using this first set of relations, it is possible to check whether certain trouble occurring is due to deterioration of the pump performance.

(B) Procedure for Evaluating the Degree of Deterioration of Pump Performance The degree by which the performance of the centrifugal pump has deteriorated can be evaluated by various methods. In one method, the relative amount of decrease in the pump discharge ($Q_0'/Q_0$) is used as a measure for the deterioration of the pump performance. The value of $Q_0'/Q_0$ can be determined by the following procedure.

(1) Determine the velocity of the fluid at the nozzle $V'$ from the detected pressure of concentrated solution $P_2'$.

(2) Determine the flow of concentrated solution $Q_2'$ from the present value of the nozzle opening $A_v$ and the value of $V'$ determined in step (1).

(3) Estimate or initialize $Q_0'$ for the present value of pump discharge in the case of pump deterioration.

(4) Use the detected pump discharge pressure $P_0'$, the initial value $Q_0'$ set in step (3) and the coefficient $a_1$ for the pressure loss in the feed line, so as to determine the membrane interfacial pressure $P'_M$ by solving the equation $$P'_M = P_0' - P'_{L1} = P_0' - a_1(Q_0')^2.$$

(5) Use $C_0$ or the constant for the concentration of feed solution, $Q_0'$ as set in step (3) and $Q_2'$ as determined in step (2), so as to determine the membrane interfacial concentration $C'_M$ by the procedure described in (ii)(B).

(6) Determine the corresponding osmotic pressure $\pi'_M$ from the membrane interfacial concentration $C'_M$ determined in step (5).

(7) Use $P'_M$ and $\pi'_M$ respectively determined in steps (4) and (6), so as to determine the reverse osmotic pressure $\Delta P'$ by the procedure described in (ii)(B).

(8) Using the membrane performance index K calibrated by the detected temperature T, the reverse osmotic pressure $\Delta P'$ determined in step (7) and $Q_2'$ determined in step (2), solve the equation: $A_M K \Delta P' + Q_2' = Q_1' + Q_2' = Q_0'_{calc}$ wherein $Q_0'_{calc}$ is the calculated value of the pump discharge.

(9) Update the value of $Q_0'$ and repeat the sequence of steps (3) to (8) until the calculated value of pump discharge $Q_0'_{calcl}$ becomes equal to the initially set $Q_0'$. The finally obtianed value of $Q_0'_{calc(final)}$ should represent the present vlaue of pump discharge.

(10) Calculate the ratio of the present value of pump discharge $Q_0'_{calc(final)}$ to $Q_0$ which represents the discharge from the pump under normal pump conditions for the same nozzle opening and fluid flow.

Figure 12A:
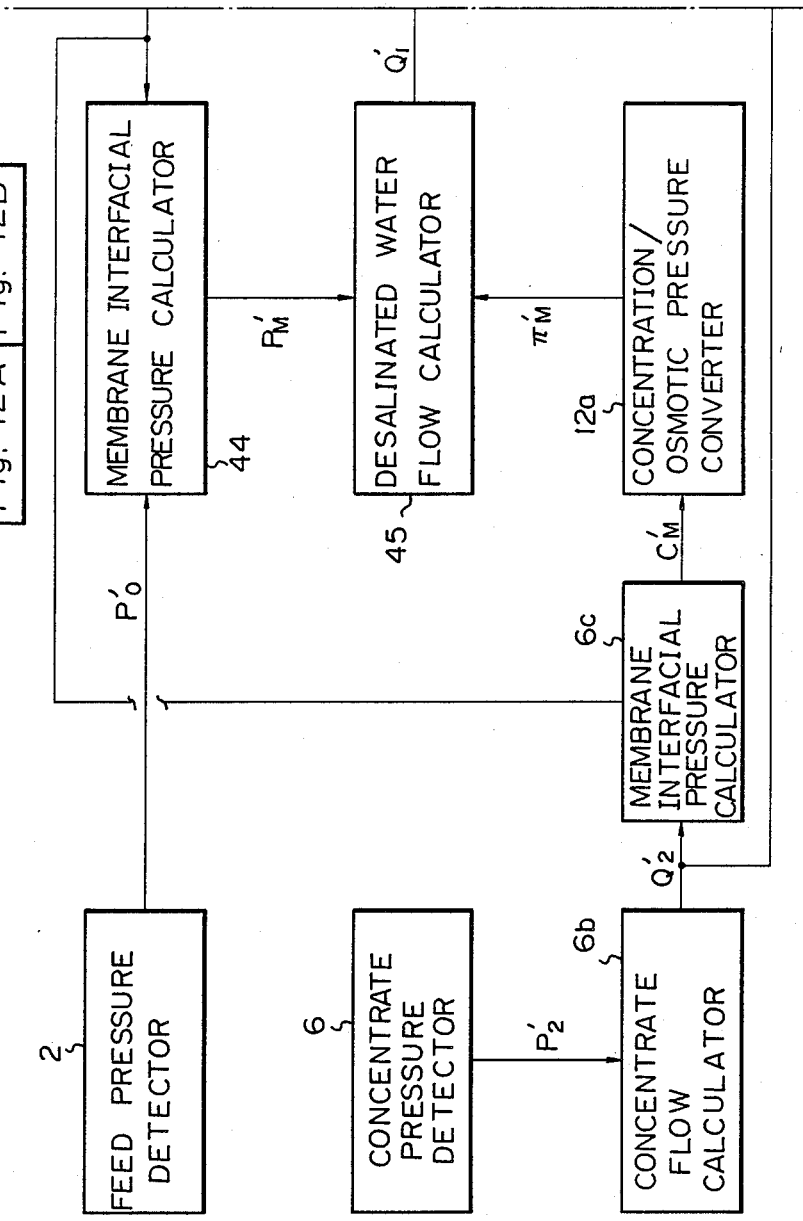
FIG. 12 is a block diagram of a device for monitoring the performance of the centrifugal pump.
Figure 12B:
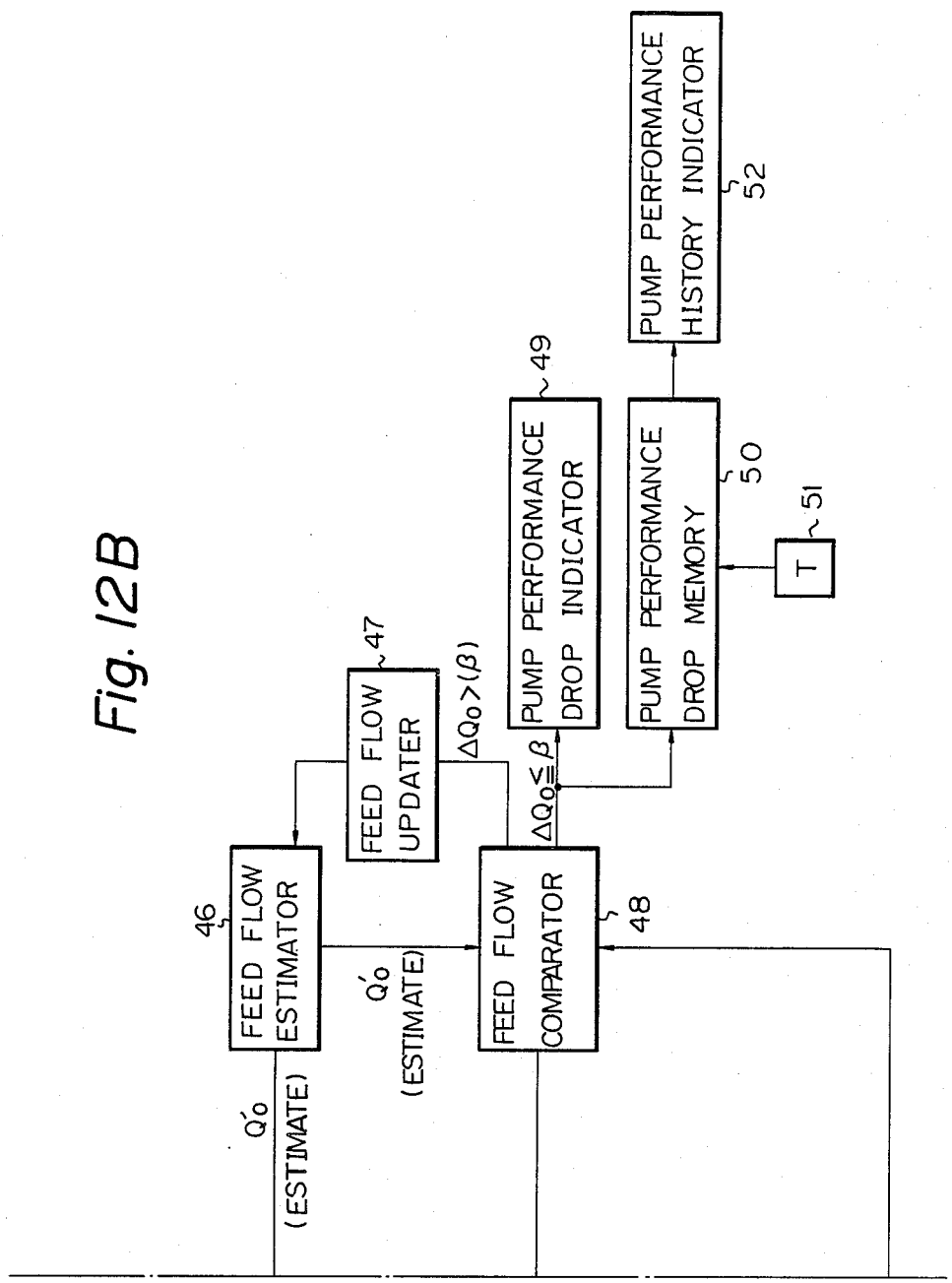
Figure 13:
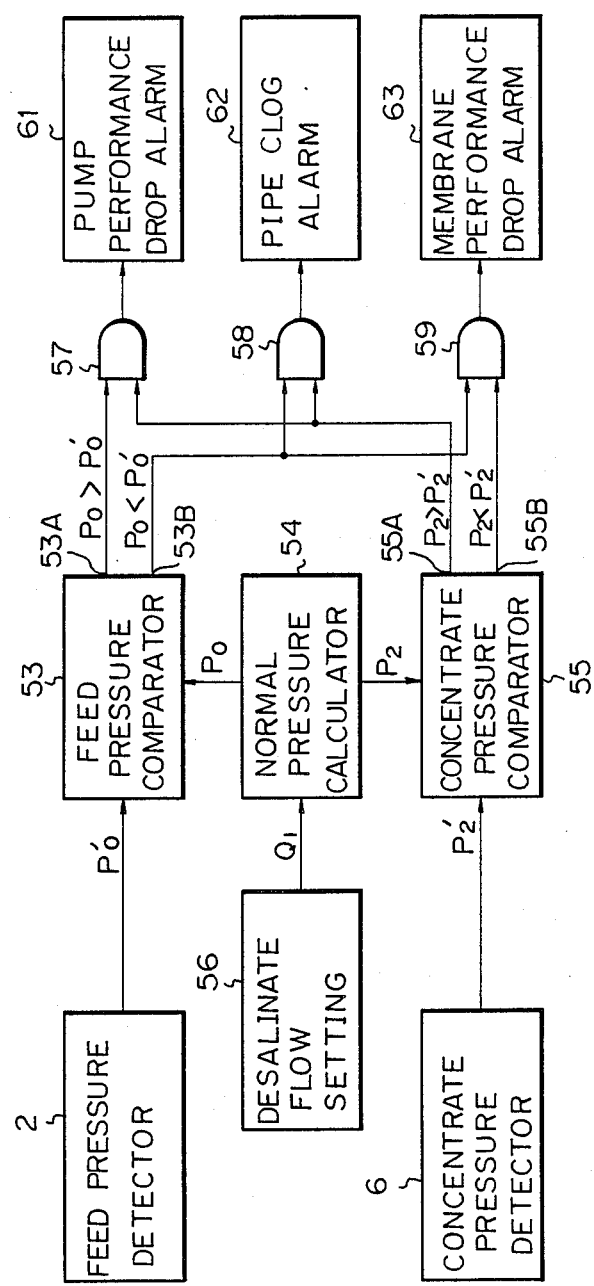
FIG. 13 is a block diagram of a device with alarms for providing selective and individual checking of deteriorated or abnormal performance of different components in the reverse osmotic treatment system.

(C) Device for Monitoring Pump Performance (FIG. 12)

FIG. 12 is a block diagram of the device according to the present invention which monitors the drop in the pump performance (as indicated by $Q_0'/Q_0$) by following the procedure illustrated in (B) above.

As shown in FIG. 12, a first pressure detector 2 disposed on the feed line provides a memebrane interfacial pressure calculator 44 in the monitor with a signal indicative of the pressure of the feed solution $P_0'$. Using the constant representing $a_1$ or the coefficient for the pressure loss in the feed line, a signal indicative of $Q_0'$ which is an estimated value of the present flow of the feed solution that is supplied from a feed flow estimator 46, and a signal indicative of $P_0'$ which is the feed pressure that is supplied from the detector 2, the calculator derives $P'_M$ or the average pressure of the feed fluid in the semipermeable membrane in accordance with the correlation $P'_M = P_0' - a_1(Q_0')^2$.

As shown in FIG. 12, a second pressure detector 6 is disposed on the secondary line and provides a concentrate flow calculator 6b in the monitor with a signal indicative of the pressure of the concentrated solution $P_2'$. this pressure signal $P_2'$ and a signal indicative of the present value of valve opening $A_v$ that is supplied from a nozzle opening calculator in the control unit (not shown), the calculator 6b determines $Q_2'$ or the flow of the concentrated solution in accordance with the correlation $$Q_2' = A_v V = A_v \alpha \sqrt{2gP_2'}.$$

Using the calculated value $Q_2'$ of the flow of concentrated solution which is sent from calculator 6b and the estimated value $Q_0'$ of the flow of the feed solution that is sent from an estimator 46, a membrane interfacial pressure calculator 6c determines the membrane interfacial pressure $C'_M$ in accordance with the correlation $C'_M = C_0(1 + Q_0'/Q_2')/2$. A signal indicative of $C'_M$ is sent to a concentration/osmotic pressure converter 12a, which then converts the concentration $C'_M$ to the corresponding osmotic pressure $\pi'_M$. A desalinated water flow calculator 45, in response to the membrane interfacial pressure signal $P'_M$ from the calculator 44, the signal $\pi'_M$ from the converter 12a that represents the average concentration of the feed solution in contact with the semipermeable membrane, and the signal T from temperature detector 14 (see FIG. 11) that indicates the temperature of the fluid, calculates the flow of desalinated water $Q_1'$ in accordance with the correlation $Q_1' = A_M K \Delta P = A_M K_0 (Dw/T)(P'_M - \pi'_M - P_1 + \pi_1)$ wherein $K_0$, $P_1$ and $\pi_1$ are constants. A feed flow comparator 48 obtains a calculated vlaue $Q_0'_{calc}$ of the flow of the feed solution by adding the calculated vlaue $Q_2'$ of the flow of the concentrated solution supplied from calculator 6b and the calculator 45. The comparator 48 also compares $Q_0'_{calc}$ with the estimated vlaue $Q_0'$ of the feed flow supplied from estimator 46. If the value of the differnece $\Delta Q_0$ obtained by subtracting $Q_0'_{calc}$ from $Q_0'$ is greater than a predetermined positive value $\beta$, the comparator 48 furnishes a command signal to an updater 47, which then adds an increment signal into the estimator 46. In response to this increment signal, the estimator 46 provides another estimated value of the flow of desalinated water which is larger than the previously estimated value. If $Q_0'$ is smaller than $Q_0'_{calc}$ and if the absolute value of the difference $\Delta Q_0$ is larger than the predetermined value, the comparator 48 provides a command signal to the updater 47, which then adds a decrement signal into the estimator 46. In response to this decrement signal, the estimator provides another estimated value of the flow of desalinated water which is smaller than the firstly estimated value. The monitor uses either one of these freshly estimated values for performing the necessary recalculation.

If the difference $\Delta Q_0$ between $Q_0'$ and $Q_0'_{calc}$ is smaller than the predetermined value $\beta$ (indicating the correctness of the estimated value $Q_0'$), the comparator 48 uses $Q_0$ or the normal flow of the feed solution under normal pump conditions (for the temperature and valve opening which are the same as the respective present values) in order to calculate the ratio of the final estimated value $Q_0'$ (indicative of the present value of the feed flow) to the normal feed flow $Q_0$. The ratio $\gamma = Q_0'/Q_0$ is sent to an indicator 49, which then indicates the present level of the degree by which the flow of the feed solution has been decreased. This degree can be used as a measure for the percent deterioration of the pump performance.

The output signal $Q_0'/Q_0$ from the comparator 48 may be loaded into a memory 50 periodically at intervals determined by a timer 51. By reading the stored data from the memory, a history indicator 52 will indicate the history of the fluctuation in the flow of the feed solution that has occurred due to the deterioration of the pump performance.

(v) Modifying the Valve Opening by the Monitors

It is preferred that the control signals furnished to the valve actuator from the control unit be modified according to variations in the system performance. The respective monitors shown in (ii)(C), (iii)(C) and (iv)(C) may be used to achieve this purpose. More specifically, by combining with the control unit that has been described earlier in this specification in connection with FIGS. 2 and 4, each of these monitors may be used as means for modifying the control signal applied to the valve actuator. For example, updating of the membrane performance index can be achieved by feeding the control unit with the present value of membrane performance index $K_0$ that has been evaluated by the membrane performance monitor. Using the updated index (indicating the current performance of the reverse osmotic apparatus), the control unit can modify the stroke signal to be applied to the valve actuator. In a like manner, the control unit can be supplied with the current values of the channel pressure loss coefficients $a_1$ and $a_2$ (as evaluated by the channel clogging monitor) in place of the constants that were previously used as measures for the past performance of the channels. Using the new data of channel pressure loss, the control unit may perform another calculation to modify the stroke signal to be applied to the valve actuator. Also, the evaluated value obtained by the pump performance monitor may be used by the control unit which then modifies the stroke signal to be supplied to the valve actuator. In the last mentioned case, it would be advisable to estimate the current Q-H characteristics of the pump on the basis of several operating points (for both pump discharge pressure and pump discharge) that have been detected by the pump performance monitor. A typical technique for this estimation is interpolation between the detected pump operating points.

The output from the respective monitors will enable the operator to determine whether the three major components of the system (semipermeable membrane, flow channels and centrifugal pump) need inspection, repair or replacement (vi) Trouble Detecting Device for the Three System Components (FIG. 13)

FIG. 13 is a block diagram of the trouble detecting device that will provide a visible and/or audible alarm indicating an abnormal drop in the performance of one of the three major components of the reverse osmotic treatement system. The principle of detecting the abnormality of the respective components has already been described in (ii)(A), (iii)(A) and (iv)(A).

In the embodiment shown below, the detecting means consists of a pressure sensor 2 for detecting the pressure of the feed solution $P_0'$ and a pressure sensor 6 for detecting the pressure of the concentrated solution $P_2'$. Referring again to Decision Table I, the following relations can be used to identify which of the three components has deteriorated. If $P_0 < P_0'$ and $P_2 < P_2'$, the performance of the reverse osmotic apparatus has deteriorated. If $P_0 < P_0'$ $P_2 > P_2'$, at least some part of the flow channels is clogged. If $P_0 > P_0'$ and $P_2 > P_2'$, the performance of the pump has deteriorated.

In these relationships, normal values $P_0$ and $P_2$ are compared with the respective detected values $P_0'$ and $P_2'$, and they indicate the normal pressures of feed solution and concentrated solution for the case where system parameters (e.g. fluid temperature T and valve opening $A_v$) other than that relating to the component to be checked are the same. The values of $P_0$ and $P_2$ are either stored in the control system or can be calculated from associated parameters.

Referring now to FIG. 13, a pressure sensor supplies a comparator 53 with a signal indicative of the present value $P_0'$ of the pressure of feed solution. A pressure sensor 6 supplies a second comparator 55 with a signal indicative of the present value $P_2'$ of the pressure of concentrated solution. An input device 56 (which may be of keyboard type and may be the same as the input device 35 shown in FIG. 5) supplies a normal pressure calculator 54 with a signal indicative of the present value $Q_1$ of the desired flow of desalinated water. Using the present value of valve opening $A_v$, the present value of the temperature T of the feed solution as detected by temperature sensor 14 (see FIGS. 2 and 14) and the preset value of $Q_1$ of the flow of desalinated water, the calculator 54 calculates the normal value $P_0$ of the pressure of the feed solution and the normal value $P_2$ of the pressure of the concentrated solution which would be provided if normal operation of the system were perfomed with those values of $A_v$, T and $Q_1$. The calculator 54 may be realized by part of the control unit shown in FIG. 2. As already mentioned, the control unit of FIG. 2 derives from the present value of the desalinated water flow $Q_1$ and the detected temperature T, $P_0$ (the normal pressure of the feed soluion) and $P_2$ (normal pressure of the concentrated solution) as intermediate output that precedes the operation of determining the final output, or the valve opening $A_v$ for the valve actuator. Needless to say, the determination of $P_0$ and $P_2$ presupposes the normal operation of the entire system.

Alternatively, various values of $P_0$ and $P_2$ that correspond to a set of various levels of temperature and the flow of desalinated water may be prestored in a memory. In this case, the normal values $P_0$ and $P_2$ may be read out of the memory by accessing with an address signal that specifies the present detected value of temperature T and the current setting of the flow of desalinated water $Q_1$.

The signals indicative of the normal values $P_0$ and $P_2$ are respectively supplied into a feed pressure comparator 53 and a concentrate pressure comparator 55. The comparator 53 compares $P_0$ with $P_0'$ which indicates the present value of the feed pressure that has been sent from the detector 2. If $P_0$ is greater than $P_0'$ by a degree that exceeds a tolerable range $l_0$ (i.e. $P_0 \geq P_0' + l_0$), the comparator 53 provides one input of an AND gate 57 (for checking a drop in the pump performance) with a signal (logical "1") through a line 53A. On the other hand, if the present value $P_0'$ is greater than the normal value $P_0$ by a degree that exceeds the tolerable range $l_0$ (i.e. Phd $0 + l_0 \leq P_0'$), the comparator 53 provides one input of an AND gate 58 (for checking line clogging) and one input of an AND gate 59 (for checking a drop in the membrane performance) with a signal through a line 53B. In a like manner, the second comparator 55 compares $P_2$ with $P_2'$ indicates the present value of the concentrate pressure that has been sent from the detector 6. If $P_2$ (normal value) is greater than $P_2'$ by a degree that exceeds a tolerable range $l_2$ (i.e. $P_2 \geq P_2' + l_2$), the comparator feeds a signal to the second inputs of AND gates 57 and 58 through a line 55A. If $P_2'$ is greater than $P_2$ by a degree that exceeds the tolerable range $l_2$ (i.e. $P_2 + l_2 \leq P_2'$), the comparator 55 feeds a signal to the other input of AND gate 59 through a line 55B.

The values of $l_0$ and $l_2$ indicate the widths of the dead zones of respective comparators 53 and 55. These comparators can be realized by operational amplifiers having hysteresis characteristics with dead zones of widths of $l_0$ and $l_2$. The magnitude of $l_0$ and $l_2$ also indicate the severity of any trouble occurring in a certain component in the system. Each of the comparators 53 and 55 may be composed of two or more units of comparator having different ranges of dead zone. By using this configuration, problems of different severity that have occurred in the same component can be distinguished from each other.

For the purpose of simplicity, the following description will use the phrase "a detected pressure is larger (smaller) than the normal value", which is equivalent to saying that "a detected pressure is larger (smaller) than the normal value by a degree that exceeds the width of the dead zone of a comparator".

If the detected value $P_0'$ of the pressure of the feed detected solution is smaller than the normal value $P_0$, and if the value $P_2'$ of the pressure of the concentrated solution is also smaller than the normal value ($P_0 > P_0'$ and $P_2 > P_2'$), the AND gate 57 is enabled to supply a signal to an alarm 61 which then provides an audible and/or visible alarm indicating a drop in the performance of the pump.

If $P_0'$ is larger than $P_0$ and $P_2'$ smaller than $P_2$ ($P_0 > P_0'$ and $P_2 > P_2'$), the AND gate 58 is enabled to supply a signal to an alarm 62 which then provides an audible and/or visible alarm indicating a line or channel clogging.

If $P_0'$ and $P_2'$ are larger than $P_0$ and $P_2$, respectively ($P_0 < P_0'$ and $P_2 < P_2'$), the AND gate 59 is enabled to provide a signal to an alarm 63, which then provides an audible and/or visible alarm indicating a deteriorated or abnormal operation of certain reverse osmotic modules.

As will be understood from the foregoing description, the trouble detecting device of FIG. 13 enables the oeprator to know which of the three major components of the reverse osmotic treatment system has experienced a drop in their performance. If desired, two or more comparators having different widths of dead zone may be used for detecting trouble in each component. By so doing, the operator is able to know whether a particular component (reverse osmotic apparatus, pump or fluid channels) requires inspection, repair or replacement, as well as when such task should be carried out.

In the embodiment of FIG. 13, feed pressure sensor 2 and concentrate pressure sensor 6 are used as detection means. If desired, flowmeters may be disposed on the feed line and/or concentration line together with these pressure sensors or as an alternative thereto (see Decision Table I).

While the control system of the present invention has been described in the foregoing pages by reference to the preferred emboidments shown in the accompanying drawings, it should be understood that these emboidments are for illustrative purposes only and various modifications or alterations may be made by those skilled in the art without departing from the scope and spirit of the invention.

We claim:

1. A reversible osmotic treatment system comprising:
(a) a centrifugal pump for pressurizing a feed fluid;
(b) a reverse osmotic apparatus including:
   a semipermeable membrane means for separating the feed fluid into a relatively purified product fluid and a relatively concentrated fluid;
   a primary line for feeding said reverse osmotic apparatus with the pressurized feed fluid from said centrifugal pump;
   a secondary line for conveying the concentrated fluid from said reverse osmotic apparatus; and
   a tertiary line for conveying the purified product fluid from said reverse osmotic apparatus;
(c) a temperature sensor which is disposed on said primary line for detecting a temperature of the fluid being fed into said reverse osmotic apparatus and providing a signal corresponding thereto; and
(d) a control unit including:
   a single controllable means disposed on said secondary line for adjusting the pressure of the concentrated fluid;
   a desired flow setting means for setting a vlaue of a signal representing a desired flow of the product fluid;
   a means, responsive to said signal representing the desired flow of the product fluid as suppied from said desired flow setting means, for determined the pressure of the concentrated fluid in accordance with performance characteristics of said centrifugal pump and said reverse osmotic apparatus used in the system and providing a signal corresponding thereto;
   a control means, responsive to a signal representing a pressure determined by said means for determining pressure, for controlling said signal controllable means so that it adjusts the pressure of the concentrated fluid so as to be substantially equal to said determined pressure; and
   a temperature calibrating means which, in response to a signal indicating the present temperature of the feed fluid as supplied from said temperature sensor, calibrates, at the detected temperature, the performance characteristics of said reverse osmotic apparatus for use by said means for determining pressure, thereby allowing the system to provide the product fluid at a flow rate substantially equal to the desired flow.

2. A reverse osmotic treatment system according to claim 1, wherein said signal controllable means consists of a single controllable valve and an actuator therefor, and wherien said control means supplies said actuator with a signal indicating a stroke by which said valve is to be shifted.

3. A reverse osmotic treatment system accoridng to claim 2, further comprising an optimum speed determining means which, in response to said signal representing the desired flow of the product fluid as supplied from said means for setting a desired flow, determines an optimum speed of said centrifugul pump that minimizes the power requirements for said pump, and further comprising a means which, responsive to said optimum speed determining means, controls the speed of a motor for driving said centrifugal pump so that said pump rotates at an optimum speed.

4. A reverse osmotic treatment system according to claim 2, further comprising a channel performance identifying means which identifies a pressure loss in the system fluid lines, wherien said means for determining pressure is responsive to said channel performance identifying means so as to determine the pressure of the concentrated fluid which is dependent upon the pressure loss.

5. A reverse osmotic treatment system according to claim 4, further comprising a first monitoring means for monitoring performance of said centrifugal pump, and a first updating means which, in response to said first monitoring means, updates performance characteristics of said centrifugal pump for use by said means for determining pressure in accordance with the performance characteristics of said centrifugal pump being monitored, thereby permitting said control unit to control said valve in accordance with the present performance of the reverse osmotic treatment system.

6. A reverse osmotic treatment system according to claim 4, further comprising a second monitoring means for monitoring performances of said reverse osmotic apparatus, and a second updating means which, in response to said second monitoring means, updates the performance characteristics of said reverese osmotic apparatus for use by said means for determining pressure in accordance with the performance characteristics of said reverse osmotic apparatus being monitored.

7. A reverse osmotic treatment system according to claim 2, further comprising a third monitoring means for monitoring a pressure loss in the system lines, and third updating means which, in response to said third monitoring means, updates said channel performance identifying means in accordance with the pressure loss being monitored.

8. A reverse osmotic treatment system comprising:
(a) a centrifugal pump for pressurizing an impure fluid;
(b) a reverse osmotic apparatus including:
   a semipermeable membrane means for separating the impure fluid into a relatively purified water and a relatively concentrated fluid;
   a primary line for feeding said reverse osmotic apparatus wit the pressurized fluid from said centrifugal pump;
   a second line for conveying the concentrated fluid from said reverse osmotic apparatus; and
   a tertiary line for conveying the purified water that has passed through the semipermeable membrane means in said reverse osmotic apparatus;
(c) a temperature sensor which is disposed on said primary line for detecting a temperature of the fluid being fed into said reverse osmotic apparatus and providing a signal corresponding thereto; and
(d) a control unit comprising:
   a single controllable valve which is disposed on said secondary line for adjusting the pressure of the concentrated fluid;
   an input means for setting a vlaue of a signal representing a desired flow of the purified water.
   a system performance idnetifying means for providing signal representing performance characteristics of the centrifugal pump and a membrane performance index of said reverse osmotic apparatus and a pressure loss in the system fluid lines;
   a means which, in response to said signals from said input means and said system performance identifying means, calculates a pump discharge pressure corresponding to the desired flow of the purified water in accordance with flow of the purified water versus pump discharge pressure characteristics;

a means, responsive to said means for calculating a pump discharge pressure and said pressure loss signal, for determining pressure in the secondary line;

a value stroke determining means which, in response to said means for determining secondary line pressure, provides a signal representing a stroke which corresponds to the determined pressure in the secondary line and by which said value is to be shifted;

a means for controlling said valve in response to a said signal from said valve stroke detrmining means; and a temperature calibrating means which, in response to a signal indicating the present temperature of the impure fluid as supplied from said temperature sensor, calibrates, at a detected temperature, the performance characteristics of said reverse osmotic apparatus fur use by said means for calculating a pump discharge pressure means, thereby allowing the system to provide the purified water at a flow rate substantially equal to the desired flow.

9. A reverse osmotic treatment system comprising:
(a) a centrifugal pump for pressurizing an impure fluid;
(b) a reverse osmotic apparatus including:
a semipermable membrane means for separating the impure fluid into a relatively purified water and a relatively concentrated fluid;
a primary line for feeding said reverse osmotic apparatus with the pressurized impure fluid from said centrifugal pump;
a secondary line for conveying the concentrated fluid from said reverse osmotic apparatus; and
a tertiary line for conveying the purified water from said reverse osmotic apparatus;
(c) a temperature sensor which is disposed on said primary line for detecting a temperature of the impure fluid being fed into said reverse osmotic apparatus and providing a signal corresponding thereto; and
(d) a control unit comprising:
a single adjustable valve means which is disposed on said secondary line for adjusting the fluid pressure in said secondary line;
an input means for setting a vlaue of a signal representing a desired flow of the purified water;
a means which, in response to a signal from said temperature sensor which indicates a temperature T, determines a membrane performance index K in accordance with the equation: $K = K_O (Dw/T)$, wherein $K_O$ is a performance index which is independent of the temperature of the membrane in said reverse osmotic apparatus and Dw is a diffusion coefficient of the membrane and provides a signal corresponding thereto;
an identifying means for providng signals representing pump discharge versus discharge pressure characteristics;
a means which, by using the signals corresponding to the membrane performance index K and the pump discharge versus discharge pressure characteristics which are combined to define the system performance and are respectively provided by said membrane performance index determining means and said identifying means calculates the fluid pressure in the system corresponding to the flow of the purified water provided by said input means and outputs a signal corresponding thereto;

a stroke calculating means which, using the signal corresponding to the pressure of the concentrated fluid provided by said means for calculating pressure, calculates a stroke by which said valve means is to be shifted in order to provide an opening of said valve means necessary for achieving the calculated fluid pressure and outputs a signal corresponding thereto; and a valve control means for shifting said valve means in response to the signal from said stroke calculating means.

10. A reverse osmotic treatment system according to claim 9, further comprising another means for determining channel performance associated with the pressure loss in the fluid lines, said means for calculating pressure calculating the fluid pressure after compensating for the pressure loss determined by said another means for determining channel performance.

11. A reverse osmotic treatment system comprising:
(a) a centrifugal pump for pressurizing a feed fluid;
(b) a reverse osmotic apparatus including:
a semipermeable membrane means for separating the feed fluid into a relatively purified fluid and a relatively concentrated fluid;
a primary line for feeding said reverse osmotic apparatus with the pressurized feed fluid from said centrifugal pump;
a secondary line for conveying the concentrated fluid from said reverse osmotic apparatus; and
a tertiary line for conveying the purified fluid from said reverse osmotic apparatus, and a vlave disposed on said secondary line;
(c) a temperature sensor which is disposed on said primary line for detecting a temperature of the fluid being fed into said reverse osmotic apparatus and for outputting a signal corresponding thereto; and
(d) a monitoring device comprising:
a first pressure sensor which is disposed on said primary line for detecting a pressure of the feed fluid;
a second pressure sensor which is disposed on said secondary line for detecting a pressure of the concentrated fluid;
a pump performance identifying means for providing signals representing performance characteristics of said cnetrifugal pump;
a valve control means for providing signals indicating the present level of an opening of said valve;
a line performance identifying means for providing signals representing a pressure loss of the fluid in said primary and secondary lines; and
a deriving means which, in response to signals from said pump performance identifying means and said valve control means and said line performance identifying means and said temperature sensor, determines a membrane performance index $K_O$ and outputs a signal corresponding thereto.

12. A reverse osmotic treatment system according to claim 11, further comprising an indicator means which is coupled to said deriving means for indicating the present membrane performance index $K_O$.

13. A reverse osmotic treatment system according to claim 12, further comprising a memory which is coupled to said derving means for periodically storing signals supplied therfrom, and a history indicator means which is coupled to said memory for indicating data representing the history of membrane performance index as supplied from said memory.

14. A reverse osmotic treatment system according to claim 12, wherein said deriving means calculates the ratio of the present membrane index to its normal value.

15. A reverse osmotic treatment system comprising:
(a) a cnetrifugal pump for pressurizing a feed fluid;
(b) a reverse osmotic apparatus including:
a semipermeable membrane means for separating the feed fluid into a relatively purified fluid and a relatively concentrated fluid;
a primary line for feeding said reverse osmotic apparatus with the pressurized feed fluid from said centrifugal pump;
a secondary line for conveying the concentrated fluid from said reverse osmotic apparatus; and
a tertiary line for conveying the purified fluid from said reverse osmotic apparatus; and
a valve disposed on said secondary line;
(c) a temperature sensor which is disposed on said primary line for detecting a temperature of the fluid being fed into said reverse osmotic apparatus and for outputting a signal corresponding thereto; and
(d) a monitoring device comprising:
a first pressure sensor which is disposed on said primary line for detecting a pressure of the feed fluid and providing a signal corresponding thereto;
a second pressure snesor which is disppsoed on said secondary line for detecting a pressure of the concentrated fluid and providing a signal corresponding thereto;
a normal pump performance identifying means for providing signals representing normal performance characteristics of said centrifugal pump;
a valve control means for providing signals indicating an opening of said valve;
a membrane performance identifying means for providing signals representing a membrane performance index $K_O$ of said reverse osmotic apparatus;
a means which, in response to a temperature signal from said temperature sensor and the membrane performance index $K_O$ signal from said membrane performane identifying means, determines a temperature-dependent membrane performance index $K$ at a present temperature of the fluid;
a line performance identifying means for providing signals representing a pressure loss of the fluid in the primary and secondary lines;
a feed flow deriving means which, in response to signals from said line performance identifying means and said first and second pressure sensors and said valve control means and said membrance performance determining means, derives a present value $Q_O'$ of the flow of pump discharge and provides a signal corresponding thereto; and
a means for comparing signals corresponding to the present value $Q_O'$ of pump discharge supplied from said feed flow deriving means with a normal vlaue of pump discharge $Q_O$ supplied from said normal pump performance identifying means and for comparing signals corresponding to a present value $P_O'$ of the pump discharge pressure as provided from said first pressure sensor with a normal value of pump discharge pressure $P_O$ supplied form said normal pump performance identifying means, thereby determining the deviation of $Q_O'$ from $Q_O$ and the deviation of $P_O$ from $P_O'$ and providing signals corresponding thereto.

16. A reverse osmotic treatment system according to claim 15, further coprising an indicator means which, in response to deviation signals from said comparing means, indicates a present operation point of the pump relative to its normal operating point.

17. A reverse osmotic treatment system according to claim 16, further comprising a memory coupled to said comparing means for periodically storing a signal supplied therefrom, and a history indicator means which is coupled to said memory for indicating data stored in said memory which represents a history of pump performance.

18. A reverse osmotic treatment system comprising:
(a) a centrifugal pump for pressurizing a feed fluid;
(b) a reverse osmotic apparatus for separating the feed fluid into a relatively purified fluid and a relatively concentrated fluid;
(c) a primary line for feeding said reverse osmotic apparatus with the pressurized feed fluid from said centrifugal pump;
(d) a secondary line for conveying the concentrated fluid from said reverse osmotic apparatus;
(e) a tertiary line for conveying the purified fluid from said reverse osmotic apparatus;
(f) a single controllable valve disposed on said secondary line;
(g) a valve control for supplying said valve with a signal indicating an opening of said value;
(h) a temperature sensor disposed on said primary line for detecting a temperature of the feed fluid and providing a signal corresponding thereto; and
(i) a monitoring device comprising:
a first pressure sensor which is disposed on said primary line for detecting a pressure of the feed fluid and providing a signal corresponding thereto;
a second pressure sensor disposed on said secondary line for detecting a pressure of the concentrated fluid and providing a signal corresponding thereto;
a means for determining a temperature-dependent membrane performance index $K$ of said reverse osmotic apparatus as calibrated by a temperature signal supplied from said temperature sensor and providing a signal corresponding thereto;
a means for identifying pump discharge versus discharge pressure characeristics of the centrifugal pump and providing a signal corresponding thereto; and
a deriving means which, in response to signals from said first and second pressure sensors and said means for determining membrance performance and said valve control means and said pump performance identifying means, dervices a signal corresponding to a present value of a pressure loss of the fluid in said primary and secondary lines.

19. A reverse osmotic treatment system according to claim 18, further comprising normal pressure loss identifying means for providing a signal corresponding to a normal pressure loss in said primary and the secondary lines, wherein said deriving means, in response to said signal from said normal pressure loss identifying means, calculates a ratio of the present value of the pressure loss to its normal value.

20. A reverse osmotic treatment system according to claims 18 or 19, further comprising an indicator means coupled to said deriving means for indicating at least one of either a present value of the pressure loss and a pressure loss increase corresponding to a ratio of said present value to its normal value.

21. A reverse osmotic treatment system according to claim 18 or 19, further comprising a memory coupled to said deriving means for periodically storing a signal therefrom, and a history indicator coupled to said memory means for indicating the history of at least one of either a stored line pressure loss and a pressure loss increase.

22. In a reverse osmotic treatment system comprising a centrifugal pump for pressurizing a feed fluid and a reverse osmotic apparatus including:

a semipermeable membrane means for separating the feed fluid into a relatively purified fluid and a relatively concentrated fluid;

a primary line for feeding said reverse osmotic apparatus with the pressurized feed fluid from said centrifugal pump;

a secondary line for conveying the concentrated fluid from said reverse osmotic apparatus;

a tertiary line for conveying the purified fluid from said reverse osmotic apparatus;

a single adjustable valve disposed on said secondary line and valve control means for providing a signal indicative of an opening of said valve;

a checking means comprising:

a first pressure sensor which is disposed on said primary line for detecting a pressure of the feed fluid $P_O$, and providing a signal corresponding thereto;

a second pressure sensor disposed on said secondary line for detecting a pressure of the concentrated fluid $P_2'$ and providing a signal correspnding thereto;

a means for determining a normal value of the pressure of the feed fluid $P_O$ and providing a signal corresponding thereto and a normal vallue fo the pressure of the concentrated fluid $P_2$ and providing a signal corresponding thereto which would be produced if the system were operating under normal conditions; and a means which, in response to signals from said first and second pressure sensors and said means for determining normal pressure, generators one of either a first signal indicating a deterioration of the performance of the reverse osmotic apparatus if $P_O < P_O'$ and $P_2 < P_2'$, or a second signal indicating an occurrence of a line clogging if $P_O < P_O'$ and $P_2 < P_2'$, or a third signal indicating a deterioration of the performance of the centrifugal pump if $P_O > P_O'$ and $P_2 > P_2'$.

23. A reverse osmotic treatment system according to claim 22, further comprising alarm means which issues selective alarms in response to signals from said checking means.

* * * * *